United States Patent
Li et al.

(10) Patent No.: US 11,886,801 B1
(45) Date of Patent: Jan. 30, 2024

(54) SYSTEM, METHOD AND DEVICE FOR MULTIMODAL TEXT EDITING

(71) Applicants: Wei Li, Markham (CA); Che Yan, Toronto (CA); Soheil Kianzad, Toronto (CA); Jay Henderson, Markham (CA)

(72) Inventors: Wei Li, Markham (CA); Che Yan, Toronto (CA); Soheil Kianzad, Toronto (CA); Jay Henderson, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/145,295

(22) Filed: Dec. 22, 2022

(51) Int. Cl.
| | |
|---|---|
| *G06F 40/171* | (2020.01) |
| *G06F 3/0354* | (2013.01) |
| *G06F 3/04883* | (2022.01) |
| *G06F 3/0482* | (2013.01) |
| *G06F 40/103* | (2020.01) |
| *G10L 15/22* | (2006.01) |
| *G06F 3/038* | (2013.01) |
| *G10L 15/26* | (2006.01) |

(52) U.S. Cl.
CPC ........ *G06F 40/171* (2020.01); *G06F 3/03545* (2013.01); *G06F 3/0482* (2013.01); *G06F 3/04883* (2013.01); *G06F 40/103* (2020.01); *G06F 3/038* (2013.01); *G10L 15/22* (2013.01); *G10L 15/26* (2013.01); *G10L 2015/223* (2013.01)

(58) Field of Classification Search
CPC ............... G06F 3/03545; G06F 3/0482; G06F 3/04883; G06F 40/171; G06F 40/103
See application file for complete search history.

(56) References Cited

U.S. PATENT DOCUMENTS

| | | | | |
|---|---|---|---|---|
| 2006/0007190 | A1* | 1/2006 | Pettiross | G06V 30/1423 345/179 |
| 2007/0014490 | A1* | 1/2007 | Silverbrook | G06F 3/03545 382/313 |
| 2011/0134068 | A1* | 6/2011 | Shimoni | G06F 3/04883 715/702 |
| 2012/0206420 | A1* | 8/2012 | Shieh | G06V 40/30 345/179 |
| 2017/0285758 | A1* | 10/2017 | Hastings | G06F 3/03545 |
| 2020/0117658 | A1* | 4/2020 | Venkata | G06F 16/248 |
| 2023/0046860 | A1* | 2/2023 | Kim | G06V 30/22 |

OTHER PUBLICATIONS https://support.microsoft.com/en-us/office/dictate-your-documents-in-word-3876e05f-3fcc-418f-b8ab-db7ce0d11d3c Microsoft Word Dictation Tool.

(Continued)

*Primary Examiner* — Seth A Silverman

(57) ABSTRACT

Systems and methods of text editing are disclosed. A system may include a touchscreen, a memory, and a processor. A method may include receiving, from an electronic pen in communication with the processor, pressure signals indicating a detection of a first amount of pressure at a pen tip. In response to receiving the pressure signals, handwriting recognition may be activated. Touch input representing handwriting a first location of the touchscreen may then be received, and the touch input may then be converted into rendered textual content corresponding to the handwriting.

15 Claims, 29 Drawing Sheets

(56) References Cited

OTHER PUBLICATIONS https://support.microsoft.com/en-us/office/edit-your-document-with-natural-gestures-7edbcf8e-0004-484d-9b62-501a31c23ee9#:~:text=Edit%20with%20natural%20gestures&text=(If%20you%20don't%20have,Touch%20%3E%20Ink%20Editor%20pen.)&text=Draw%20a%20circle%20around%20the,color%2C%20bold%2C%20or%20italic. Microsoft Ink Editor (pen gesture introduction).
https://9to5mac.com/2022/06/10/ios-16-dictation-hands-on/ Ios 16 Dictation.
https://www.creativebloq.com/how-to/handwriting-on-the-iPad Apple Scribble Pen Gestures.
https://consumer.huawei.com/cn/support/content/zh-cn15841890/ Huawei Voice Tying.
Voice and Touch Based Error-tolerant Multimodal Text Editing and Correction for Smartphones (Zhao, Cui UIST '21).
Commanding and Re-Dictation: Developing Eyes-Free Voice-Based Interaction for Editing Dictated Text (Debjyoti, Can CHI'21).
RichReview: blending ink, speech, and gesture to support collaborative document review. Yoon D, Chen N, Guimbretière F, Sellen A, Microsoft Research.

* cited by examiner

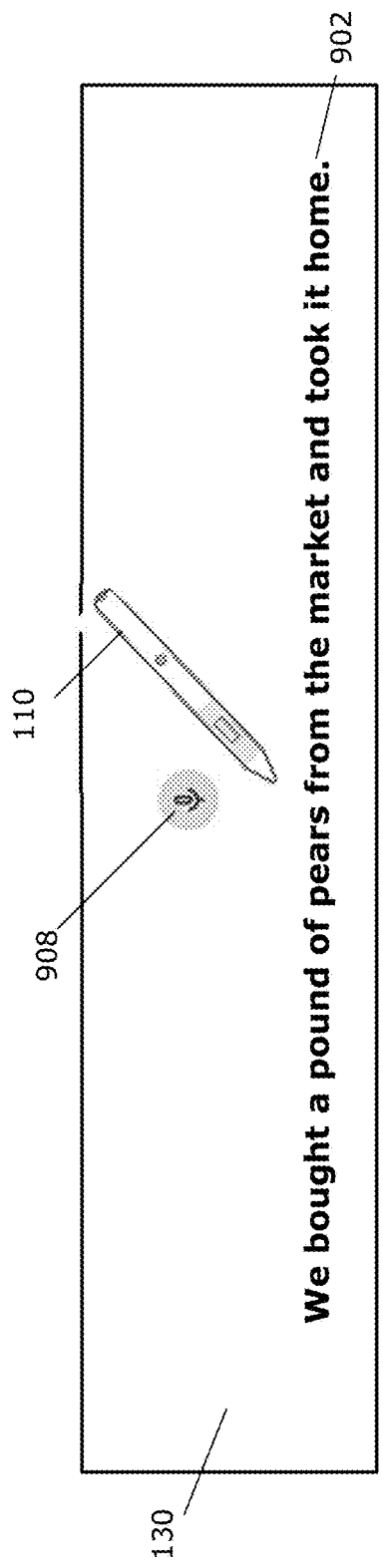
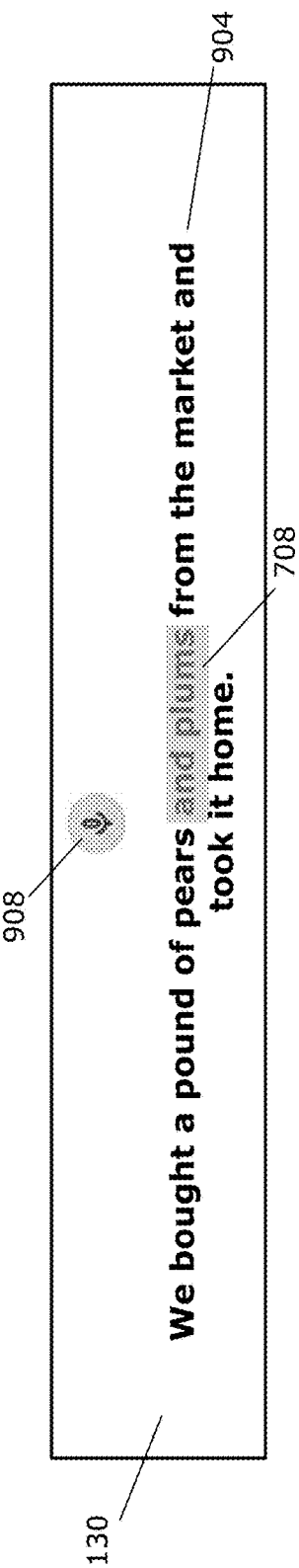
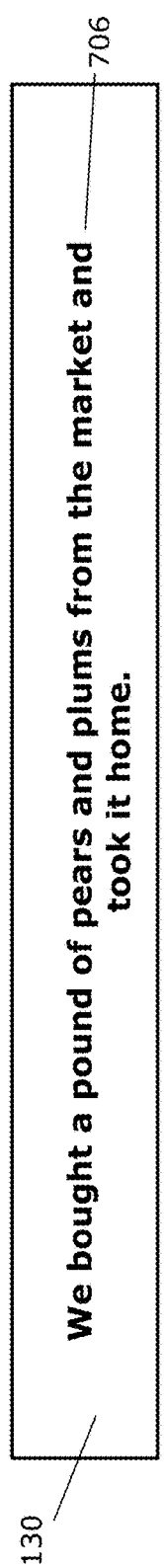
FIG. 9A
FIG. 9B
FIG. 9C

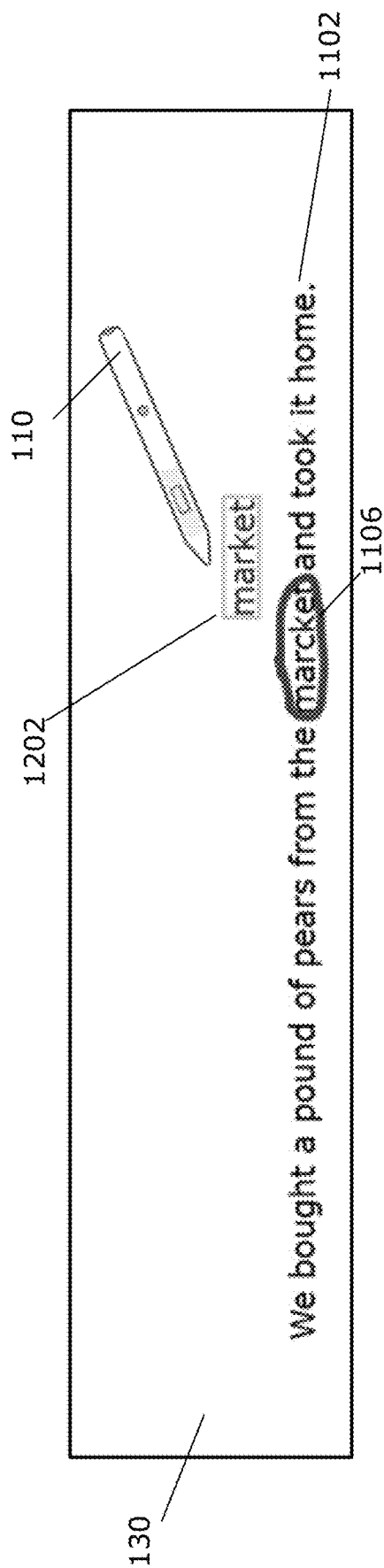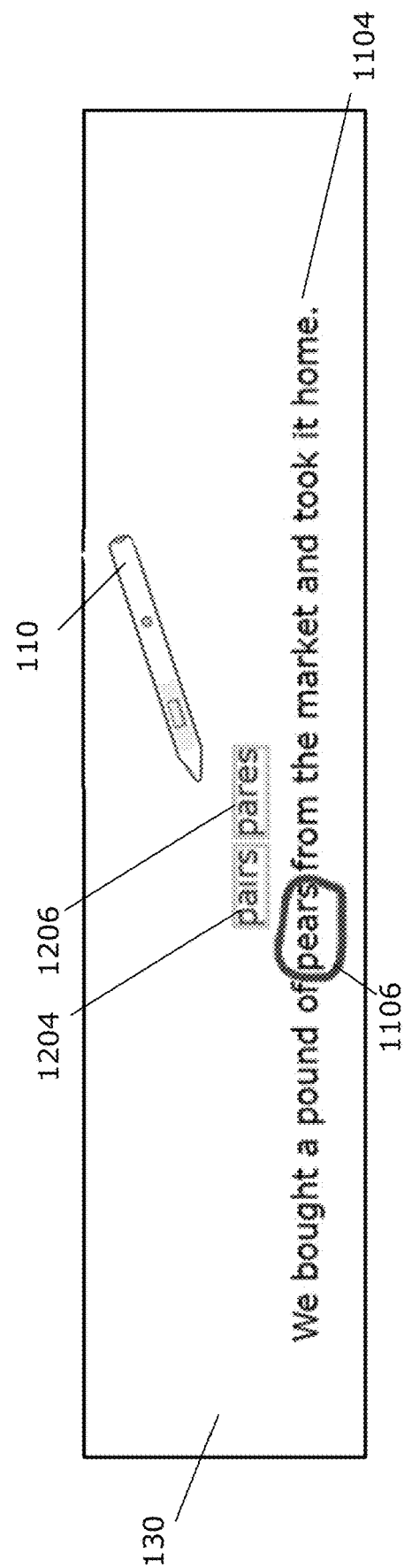
FIG. 12A
FIG. 12B

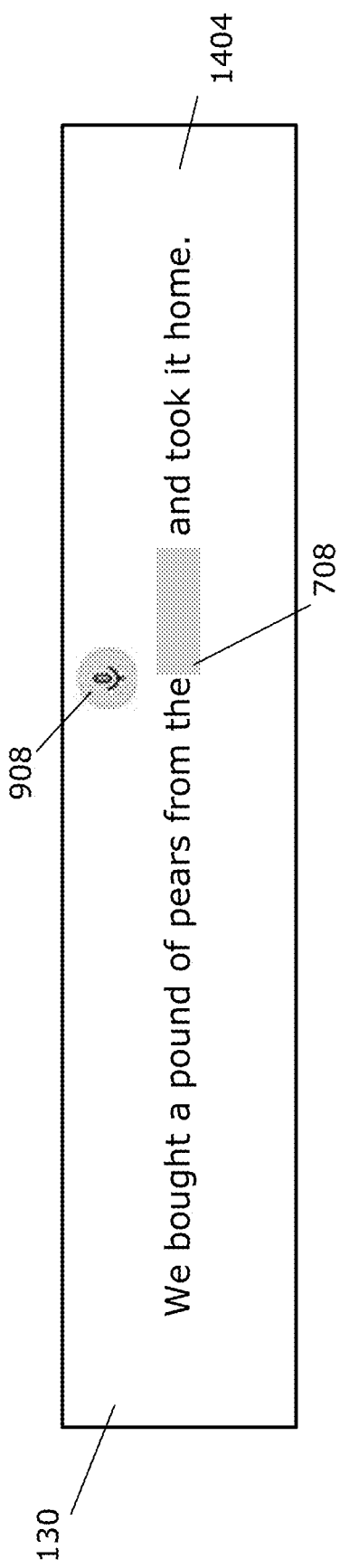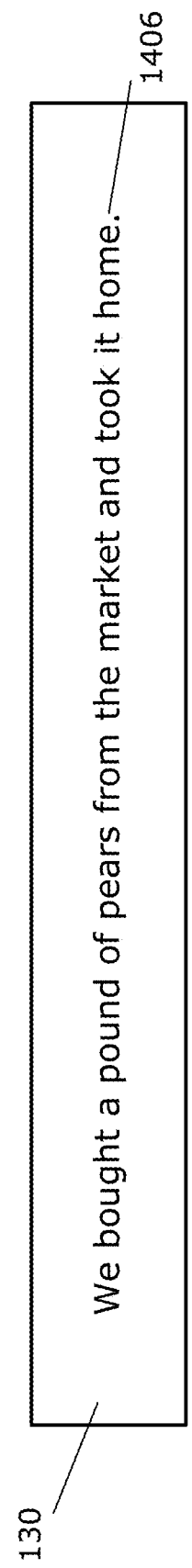

SYSTEM, METHOD AND DEVICE FOR MULTIMODAL TEXT EDITING

RELATED APPLICATION DATA

This is the first patent application related to this matter.

FIELD

The present disclosure generally relates to text editing devices and methods, including the use of an electronic pen to initiate multiple modalities of text editing.

BACKGROUND

Over recent years, as the technology of natural language processing (NLP) has become more reliable, voice input has become an increasingly popular method of entering text within text editing and word processing applications. While a competent typist may achieve seventy words per minute, over 400 words per minute may be achieved using voice input. It has been estimated that voice input is presently the third most popular text editing method, and that voice input will become the second most popular text editing method within the next five to ten years.

In spite of its strengths, voice input is inconvenient for certain common text editing tasks. While a keyboard and/or a mouse may be used in these instances, an electronic pen is a more desirable option as it provides precision, simple and intuitive gesture control, direct pointing, and portability. Thus, the productivity of text content creation may be maximized by combining voice input and pen input.

Current systems that support both voice input and pen input can be confusing to use. For example, in many such systems, a user must switch between functions such as pen writing, pen gestures, voice input, voice commands, touch input, and soft keyboard primarily through an associated user interface (UI). Improvements to the field are desired.

SUMMARY

Examples described herein combine pen input with voice input to provide an improved multimodal text editing experience, while using a touchscreen device and an electronic pen in a natural posture. Pen input may be used for more intuitive post-editing and/or short entry tasks based on voice transcribed text, which may benefit from the advantages of accurate pointing, handwriting, and other embedded sensing technologies. Examples described herein provide for inserting content, correcting content and formatting content, which may help to improve productivity.

Examples described herein may use pressure sensors within an electronic pen to provide more convenient activation and deactivation of different modalities. Examples described herein provide for contextual selection of homophones, which may help to address a classic voice dictation problem. Complex modality switching routines that may be user interface (UI) dependent may be eliminated, improving input efficiency.

Examples provided herein may provide for the text editing of voice transcribed text while the touchscreen device continues to receive voice input, providing for more seamless integration of voice input and pen input.

In accordance with one aspect of the present application, there is provided, a computer system comprising a touchscreen; a processor; and a memory coupled to the processor, the memory storing instructions which, when executed by the processor, cause the system to, during execution of a text editing application: receive, from an electronic pen in communication with the processor, pressure signals indicating a detection of a first amount of pressure at a pen tip; in response to receiving the pressure signals indicating the detection of a first amount of pressure at the pen tip, activate handwriting recognition; receive touch input representing handwriting at a first location of the touchscreen; and convert the touch input representing handwriting into rendered textual content corresponding to the handwriting.

In some implementations, the system is further caused to receive touch input at a second location of the touchscreen; receive, from the electronic pen, a request to activate voice recognition; activate voice recognition; receive, from a microphone in communication with the processor, a signal representing voice input; and convert the signal representing voice input into rendered textual content corresponding to the voice input.

In some implementations, the request to activate voice recognition is received via pressure signals, from the electronic pen, indicating a detection of a second amount of pressure at the pen tip, the second amount of pressure being distinguishable from the first amount of pressure.

In some implementations, the electronic pen further includes a button, and the request to activate voice recognition is received via an input signal indicating a button press at the button.

In some implementations, the system is further caused to receive touch input representing an ellipse at a third location of the touchscreen; identify targeted textual content, the targeted textual content being textual content rendered at the third location of the touchscreen; determine one or more replacement text candidates corresponding to the targeted textual content; display the one or more replacement text candidates as selectable options for replacement of the targeted textual content; and in response to a selection of one of the one or more replacement text candidates, replace the targeted textual content with the selected one of the one or more replacement text candidates.

In some implementations, the system is further caused to receive touch input representing an ellipse at a fourth location of the touchscreen; identify targeted textual content, the targeted textual content being textual content rendered to the fourth location of the touchscreen; receive input representing replacement content; and replace the targeted textual content with rendered textual content corresponding to the replacement content.

In some implementations, the received input is touch input representing handwriting.

In some implementations, the received input is voice input representing dictation.

In some implementations, the system is further caused to receive touch input representing a strikethrough at a fifth location of the touchscreen; identify targeted textual content, the targeted textual content being textual content rendered beneath the touch input representing a strikethrough; display one or more content format options near the targeted textual content; receive a selection of one or more content format options; and modify the targeted textual content in accordance with the received selection of the one or more content format options.

In some implementations, the system is further caused to receive touch input representing a strikethrough at a sixth location of the touchscreen; identify targeted textual content, the targeted textual content being textual content rendered beneath the touch input representing a strikethrough; receive, via the electronic pen, an instruction to activate voice recognition; activate voice recognition; receive, from a microphone in communication with the processor, a signal representing voice input; identify the voice input as a voice command corresponding to a content format option; and modify the targeted textual content in accordance with the content format option.

In some implementations, the system is further caused to receive touch input representing a strikethrough at a seventh location of the touchscreen; identify targeted textual content, the targeted textual content being textual content rendered beneath the strikethrough; receive, via the electronic pen, an instruction to activate voice recognition; activate voice recognition; receive, via a microphone in communication with the processor, voice input; identify the voice input as a voice dictation; and replace the targeted textual content with content corresponding to the voice dictation.

In some implementations, the system is further caused to receive touch input representing a strikethrough at an eighth location of the touchscreen; identify targeted textual content, the targeted textual content being textual content rendered beneath the strikethrough; receive, via the electronic pen, an instruction to activate handwriting recognition; activate handwriting recognition; remove the targeted textual content from the eighth location of the touchscreen; receive touch input representing handwriting at the eighth location of the touchscreen; and convert the touch input representing handwriting into rendered textual content corresponding to the handwriting.

In some implementations, the electronic pen further includes a button, and the system is further caused to receive, from the electronic pen in communication with the processor, an input signal indicating a button press at the electronic pen; in response to receiving the input signal indicating a button press at the electronic pen, activate voice dictation; receive touch input at a ninth location of the touchscreen; receive voice input; and render textual content corresponding to the voice dictation to the ninth location of the touchscreen.

In accordance with another aspect of the present application, there is provided a computer-implemented method for execution during a text editing application, the method comprising receiving, from an electronic pen, pressure signals indicating a detection of a first amount of pressure at a pen tip; in response to receiving the pressure signals indicating the detection of a first amount of pressure at the pen tip, activating handwriting recognition; receiving touch input representing handwriting at a first location of a touchscreen; and converting the touch input representing handwriting into rendered textual content corresponding to the handwriting.

In some implementations, the method further comprises receiving touch input at a second location of the touchscreen; receiving, from the electronic pen, a request to activate voice recognition; activating voice recognition; receiving, from a microphone, a signal representing voice input; and converting the signal representing voice input into rendered textual content corresponding to the voice input.

In some implementations, the request to activate voice recognition is received via pressure signals, from the electronic pen, indicating a detection of a second amount of pressure at the pen tip, the second amount of pressure being distinguishable from the first amount of pressure.

In some implementations, the electronic pen further includes a button, and the request to activate voice recognition is received via pressure signals from the button. The method may further comprise receiving, from the electronic pen, an input signal indicating a button press at the electronic pen; in response to receiving the input signal indicating a button press at the electronic pen, activating voice dictation; receiving touch input at a ninth location of the touchscreen, the ninth location corresponding to a position preceding a series of rendered content; receiving voice input; and rendering textual content corresponding to the voice dictation to the ninth location of the touchscreen.

In some implementations, the method further comprises receiving touch input representing an ellipse at a third location of the touchscreen; identifying targeted textual content, the targeted textual content being textual content rendered at the third location of the touchscreen; determining one or more replacement text candidates corresponding to the targeted textual content; displaying the one or more replacement text candidates as selectable options for replacement of the targeted textual content; and in response to a selection of a selected one replacement text candidate, replacing the targeted textual content with the selected one replacement text candidate.

In some implementations, the method further comprises receiving touch input representing an ellipse at a fourth location of the touchscreen; identifying targeted textual content, the targeted textual content being textual content rendered at the fourth location of the touchscreen; receiving input representing replacement content; and replacing the targeted textual content with rendered textual content corresponding to the replacement content.

According to yet another aspect of the present disclosure, there is provided a non-transitory computer readable medium containing instructions which, when executed by a processor, cause the processor to receive, from an electronic pen in communication with the processor, pressure signals indicating a detection of a first amount of pressure at a pen tip; in response to receiving the pressure signals indicating the detection of the first amount of pressure at the pen tip, activate handwriting recognition; receive touch input representing handwriting at a first location of a touchscreen; and convert the touch input representing handwriting into rendered textual content corresponding to the handwriting.

According to still yet another aspect of the present disclosure, there is provided a computer system comprising a touchscreen; a processor; and a memory coupled to the processor, the memory storing instructions which, when executed by the processor, cause the system to, during execution of a text editing application: receive a request to activate voice input; in response to receiving the request to activate voice input, activate voice recognition and display a voice cursor at a first location of the touchscreen, the voice cursor indicating a first position for rendering voice input; receive, from a microphone in communication with the processor, a signal representing voice input; processing the voice input into rendered textual content corresponding to the voice input at the first location; receive touch input at a second location of the touchscreen; in response to receiving touch input at the second location of the touchscreen, display an editing cursor at the second location of the touchscreen, the editing cursor indicating a second position, the second position being different from the first position relative to the rendered textual content corresponding to the voice input, for editing textual content; wherein the voice cursor is positioned relative to the voice input and wherein the editing cursor is positioned relative to the touch input independently of each other; and wherein the voice input is processed contemporaneously with the processing of the touch input.

In some implementations, the touch input is received via contact of the touchscreen by an electronic pen in communication with the processor.

In some implementations, the touch input is handwriting.

In some implementations, the touch input is a selection of a replacement text candidate.

BRIEF DESCRIPTION OF THE DRAWINGS

Reference will now be made, by way of example, to the accompanying drawings which show example embodiments of the present disclosure, and in which:

FIGS. 9A, 9B, and 9C illustrate example sentences rendered on a touchscreen, in accordance with examples described herein;

FIGS. 12A and 12B illustrate example sentences comprising textual content as may be rendered at a touchscreen, in accordance with examples described herein;

FIGS. 14A, 14B, 14C, and 14D illustrates example sentences comprising textual content as may be rendered at a touchscreen, in accordance with examples described herein;

Similar reference numerals may have been used in different figures to denote similar components.

DESCRIPTION OF EXAMPLE EMBODIMENTS

Embodiments described herein may operate on a variety of touchscreen devices, such as dual screen laptops, foldable laptops, standard laptops, tablets, smart phones, digital whiteboards, and the like.

In this disclosure, a "screen" refers to the outer user-facing layer of a touchscreen display.

In this disclosure, the terms "touchscreen element" and "touchscreen" refer to a combination of a display together with a touch sensing system that is capable of acting as an input device by receiving a touch input. Non-limiting examples of touchscreen displays are: capacitive touchscreens, resistive touchscreens, and Infrared touchscreens and surface acoustic wave touchscreens.

In this disclosure, the term "touchscreen device" refers to a computing device having a touchscreen element.

In this disclosure, the term "application" refers to a software program comprising of a set of instructions that can be executed by a processing device of an electronic device.

Figure 1:
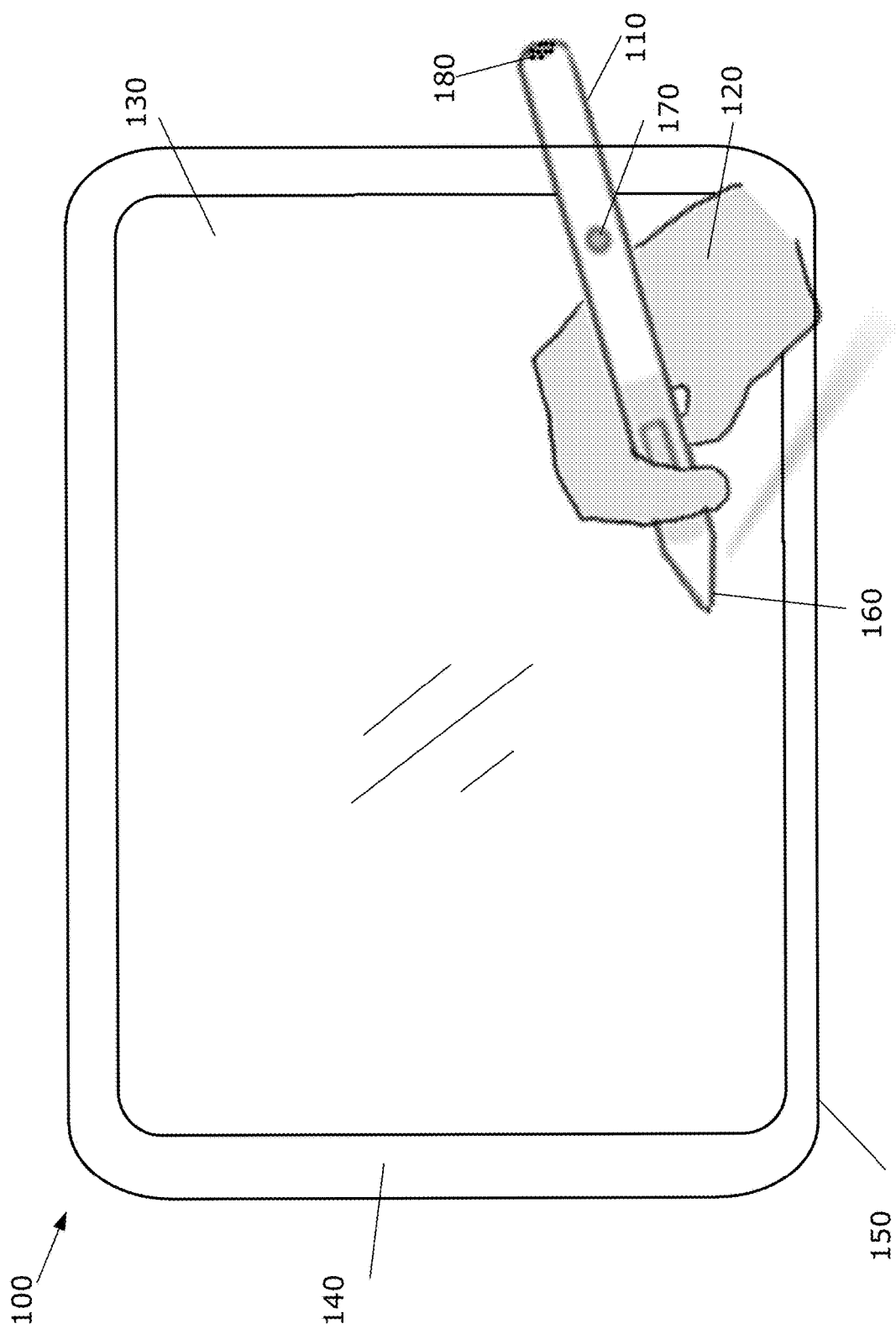
FIG. 1 is a schematic diagram illustrating a first example operating environment of an example embodiment, in accordance with examples described herein.

FIG. 1 is a schematic diagram illustrating a first example operating environment 100 of an example embodiment. As illustrated, the first example operating environment 100 includes an electronic pen 110 being held by a user's hand 120 above a touchscreen device 140.

As shown, the touchscreen device 140 includes a touchscreen element 130. The touchscreen element includes a touch panel, (an input device), and a display, (an output device). As such, the touchscreen element 130 may be operable to render content and to sense touch thereupon. As noted, the touchscreen element 130 may also be described as a touchscreen 130. The touchscreen 130 may implement one or more touchscreen technologies. For example, the touchscreen 130 may be a Resistive Film touchscreen, a Surface Capacitive touchscreen, a Projective Capacitive touchscreen, a Surface Acoustic Wave (SAW) touchscreen, an Optical touchscreen, an Electromagnetic touchscreen, etc.

The touchscreen device 140 may include a touchscreen device microphone 150. Although shown in FIG. 1 as disposed at the bottom left corner of the touchscreen device 140, the touchscreen device microphone 150 may be disposed at other locations of the touchscreen device 140, such as at the back of the touchscreen device 140.

Although FIG. 1 illustrates a tablet, the touchscreen device 140 may be a smartphone, a laptop, and/or other similar electronic device operable to execute and display thereupon a text editing application. The touchscreen device 140 may be a type of computer system within the scope of the present disclosure.

The electronic pen 110 includes a pen tip 160. The location of the pen tip 160 of the electronic pen 110 on the touchscreen 130 may be detected by the touchscreen device 140. In this way, the electronic pen 110 may function as a stylus. In some examples described herein, the electronic pen may include one or more pressure sensors for detecting pressure at the pen tip 160. The pressure sensors may be operable to determine a plurality of distinguishable amounts of pressure at the pen tip 160. The electronic pen 110 may be described as a digital pen and/or as a smart pen. In some embodiments, the electronic pen may further include a button 170. In some embodiments, the electronic pen may further include an electronic pen microphone 180.

The touchscreen device 140 may be communicatively coupled with the electronic pen 110. For example, the touchscreen device 140 may be communicatively coupled with the electronic pen 110 via Bluetooth™, near-field communication (NFC) or other form of short-range wireless communication.

Figure 2:
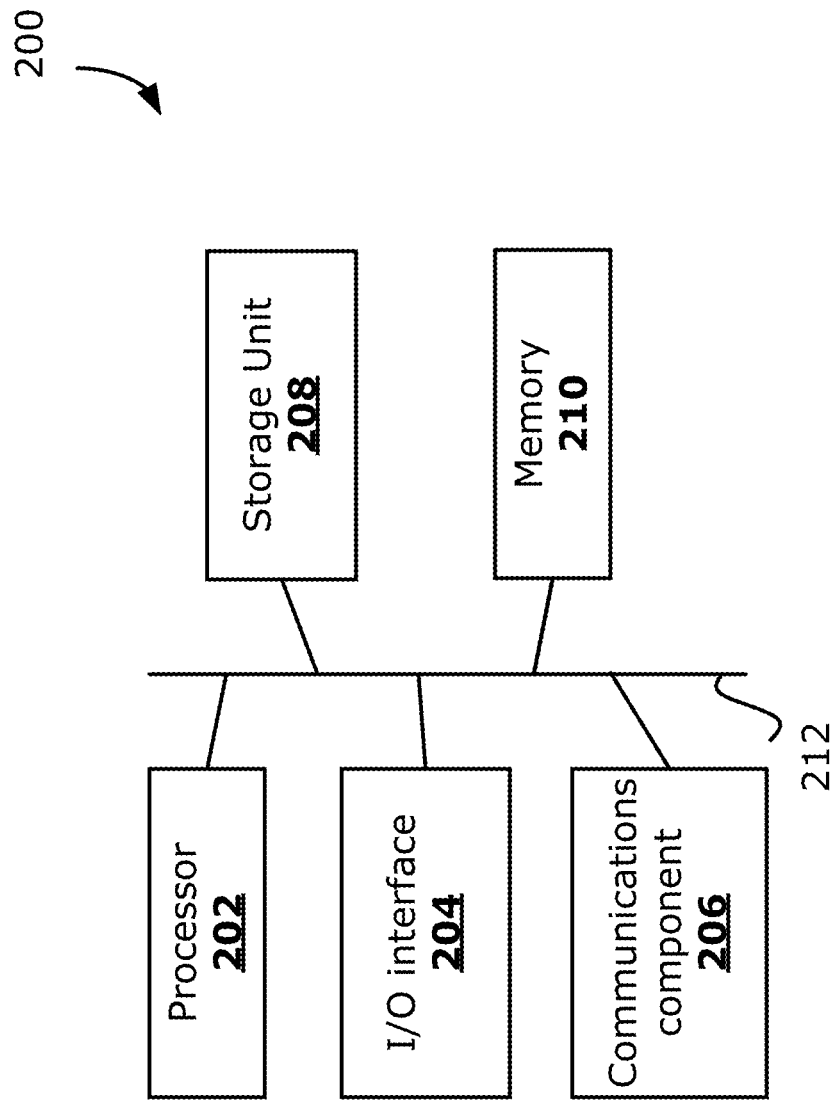
FIG. 2 is a high-level operation diagram of an example computing device 200, in accordance with examples described herein.

FIG. 2 is a high-level operation diagram of an example computing device 200, in accordance with embodiments of the present disclosure. In at least some embodiments, the example computing device 200 may be exemplary of the touchscreen device 140 (FIG. 1), and/or the electronic pen 110 (FIG. 1) and is not intended to be limiting.

The example computing device 200 includes a variety of components. For example, as illustrated, the example computing device 200 may include a processor 202, an input/output (I/O) interface 204, a communications component 206, a memory 210, and/or a storage unit 208. As illustrated, the foregoing example components of the example computing device 200 are in communication over a bus 212. The bus 212 is shown providing communication among the components of the computing device 200. The bus 212 may be any suitable bus architecture including, for example, a memory bus, a peripheral bus or a video bus.

The processor 202 may include one or more processors, such as a microprocessor, a microcontroller, an application-specific integrated circuit (ASIC), a field-programmable gate array (FPGA), a dedicated logic circuitry, or combinations thereof.

The communications component 206 allows the example computing device 200 to communicate with other computer or computing devices and/or various communications networks. The communications component 206 may include one or more network interfaces for wired or wireless communication with a network (e.g., an intranet, the Internet, a peer-to-peer (P2P) network, a wide area network (WAN) and/or a local area network (LAN)) or other node. The one or more network interfaces may include wired links (e.g., Ethernet cable) and/or wireless links (e.g., one or more antennas) for intra-network and/or inter-network communications.

The communications component 206 may allow the example computing device 200 to send or receive communications signals. Communications signals may be sent or received according to one or more protocols or according to one or more standards. For example, communications component 206 may allow the example computing device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications component 206 may allow the example computer device 200 to communicate using near-field communication (NFC), via Wi-Fi™, using Bluetooth™ or via some combination of one or more networks or protocols. In some embodiments, all or a portion of the communications component 206 may be integrated into a component of the touchscreen device 140. For example, the communications component 206 may be integrated into a communications chipset.

The example computing device 200 may include one or more memories 210, which may include a volatile (e.g. random access memory (RAM)) and non-volatile or non-transitory memories (e.g., a flash memory, magnetic storage, and/or a read-only memory (ROM)). The non-transitory memory(ies) of memories 210 store programs that include software instructions for execution by the processor 202, such as to carry out examples described in the present disclosure. In example embodiments, the programs include software instructions for implementing an operating system (OS) and software applications.

In some examples, the memory 210 may include software instructions of the example computing device 200 for execution by the processor 202 to carry out the operations described in this disclosure. In some other examples, one or more data sets and/or modules may be provided by an external memory (e.g., an external drive in wired or wireless communication with the computing device 200) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

The storage unit 208 may be one or more storage units, and may include a mass storage unit such as a solid state drive, a hard disk drive, a magnetic disk drive and/or an optical disk drive. In some embodiments of the example computing device 200, the storage unit 208 may be optional.

The I/O interface 204 may be one or more I/O interfaces, and may enable interfacing with one or more appropriate input and/or output devices, such as, for example, a physical keyboard (not shown).

Figure 3:
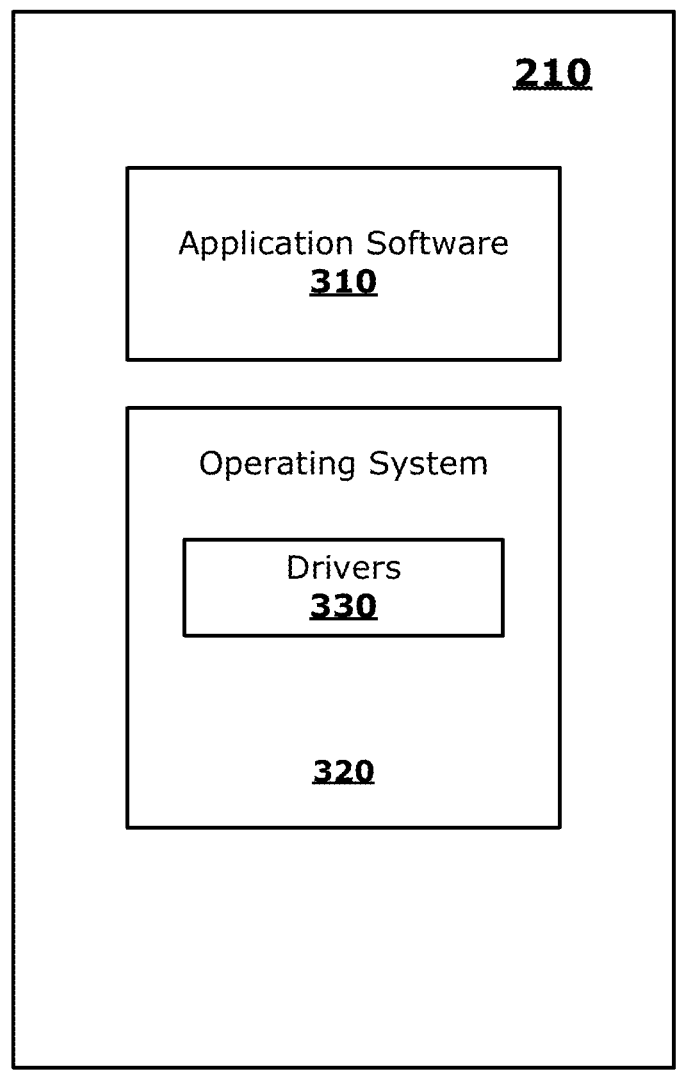
FIG. 3 depicts a simplified organization of software components that may be stored in memory of the example computing device, in accordance with examples described herein.

FIG. 3 depicts a simplified organization of software components that may be stored in the memory 210 of the example computing device 200 (FIG. 2). As illustrated, these software components include application software 310 and an operating system (OS) 320.

The application software 310 adapts the example computing device 200 (FIG. 2), in combination with the OS 320, to operate as a device performing a particular function. In some embodiments, the application software 310 may comprise a virtual input devices application.

The OS 320 is software. The OS 320 allows the application software 310 to access the processor 202, the I/O interface 204, the communications component 206, the memory 210, and/or the storage unit 208 (FIG. 2). The OS 320 may be, for example, Apple™ iOS™, Android™, Microsoft™ Windows™, Google™ ChromeOS™, or the like.

The OS 320 may include a variety of modules, such as drivers 330. A driver 330 provides a programming interface to control and manage specific lower level interfaces that are often linked to a specific type of hardware. For example, in embodiments when the example computing device 200 (FIG. 2) is operating as a touchscreen device, the OS 320 may include a touch panel driver 330 and/or a display driver 330. In embodiments when the example computing device 200 (FIG. 2) is operating as the touchscreen device 140

(FIG. 1) in communication with the electronic pen 110, the touchscreen device 140 may be referred to as a computer system.

Figure 4:
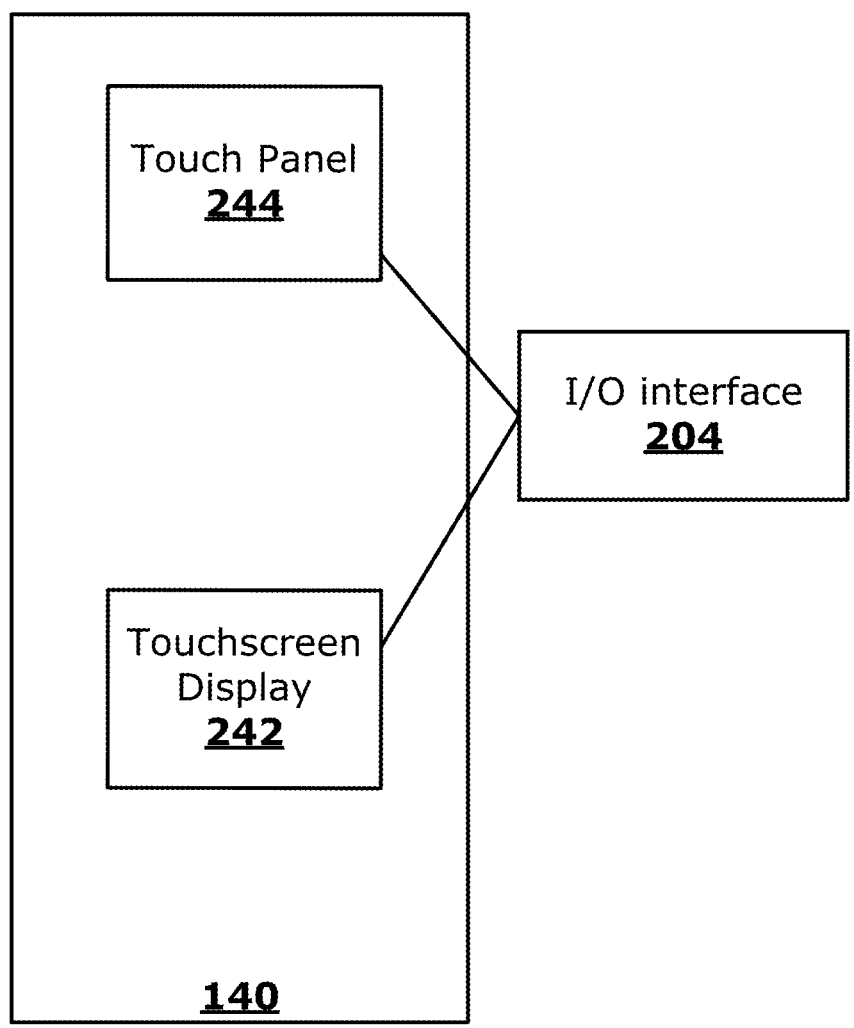
FIG. 4 is a simplified organization of components that may be interfacing with an input/output (I/O) interface, according to some embodiments, such as when the example computing device operates as a touchscreen device.

Reference is now made to FIG. 4, which is a simplified organization of components that may be interfacing with the I/O interface 204, according to some embodiments, such as when the example computing device 200 (FIG. 2) operates as a touchscreen device 140. As shown in FIG. 4, the I/O interface 204 may be in communication with the touch panel 244 and the touchscreen display 242. As previously described, the touch panel 244 and the touchscreen display 242 may form part of the touchscreen element 130. The touch panel 244 may include a variety of touch sensors for sensing touch input, which may depend on the touch sensing modality used by the touchscreen element 130 (e.g., resistive sensors, capacitive sensors, SAW devices, optical sensors, electromagnetic sensors, etc.).

In some embodiments where the example computing device 200 (FIG. 2) is operating as the touchscreen device 140, the application software 310 may render content on the touchscreen display 242 via a display driver 330 (FIG. 3), and may sense touch upon the touch panel 244 via a touch panel driver 330.

A touch panel driver 330 (FIG. 3) may, as discussed above, couple with the touch panel 244 to generate touch events. A display driver 330 (FIG. 3) may couple with the touchscreen display 242 to provide for content rendering on the touchscreen display 242.

Figure 5:
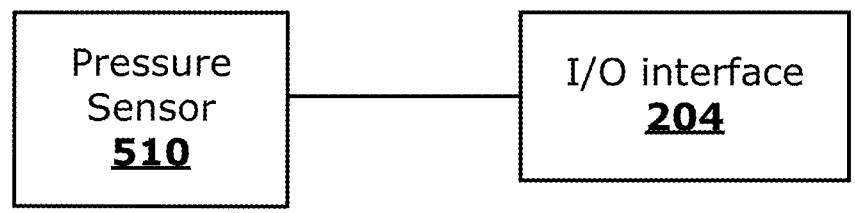
FIG. 5 is a simplified organization of components that may be interfacing with the I/O interface, according to some embodiments, such as when the example computing device operates as an electronic pen.

Reference is now made to FIG. 5, which is a simplified organization of components that may be interfacing with the I/O interface 204, according to some embodiments, such as when the example computing device operates as an electronic pen 110 (FIG. 1). As shown in FIG. 5, the I/O interface 204 may be in communication with one or more pressure sensors 510. In some embodiments, the pressure sensors 510 may be located within the electronic pen 110 (FIG. 1) and may operate to detect a plurality of distinguishable amounts of pressure at the pen tip 160 (FIG. 1).

Figure 6:
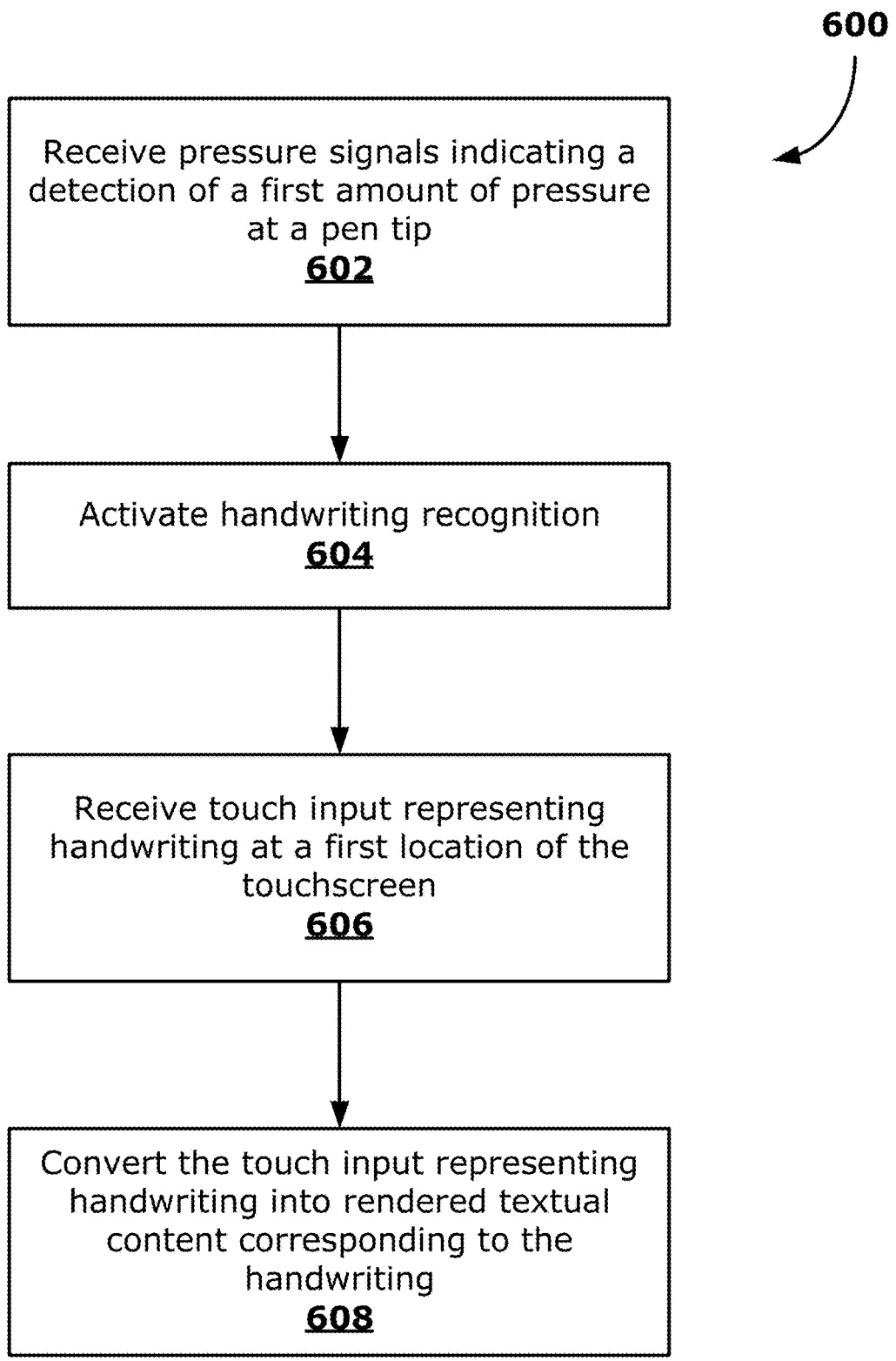
FIG. 6 is a flowchart of an example method 600 of text editing in accordance with examples described herein.

FIG. 6 is a flowchart of an example method 600 of text editing, in accordance with an embodiment of the present disclosure. The method 600 may be performed by one or more processors of a computing system, such as the one or more processors of the touchscreen device 140 (FIG. 1).

At the operation 602, the system receives pressure signals indicating a detection of a first amount of pressure at a pen tip 160 (FIG. 1). The pressure signals may be generated by one or more pressure sensors 510 (FIG. 5) of the electronic pen 110 (FIG. 1). The electronic pen 110 (FIG. 1) may be in communication with the touchscreen device 140 (FIG. 1). The pressure signals may then be received by the touchscreen device 140 (FIG. 1) from the electronic pen 110 (FIG. 1).

At the operation 604, in response to receiving the pressure signals indicating the first amount of pressure at the pen tip, the system activates handwriting recognition.

At the operation 606, the system receives touch input representing handwriting at a first location of the touchscreen 130 (FIG. 1). In some examples where the touch input is provided via the electronic pen 110 (FIG. 1), touch input may be referred to as pen stroke input.

At the operation 608, the system converts the touch input representing handwriting into rendered textual content corresponding to the handwriting. For example, in some implementations, the system may send the touch input corresponding to the handwriting to a Pen Stroke Recognition engine to convert the handwriting to computer-renderable text. The Pen Stroke Recognition engine may be located, for example, on the computing system. Additionally or alternatively, the Pen Stroke Recognition engine may be a cloud service or may reside on a remote system. The Pen Stroke Recognition engine may utilize Optical Character recognition (OCR) and/or natural language processing (NLP) neural networks to convert the handwriting to computer-renderable text. The system may receive the computer-renderable text from the Pen Stroke Recognition engine, and may subsequently display the computer-renderable text as rendered textual content on the touchscreen.

Figure 7A:
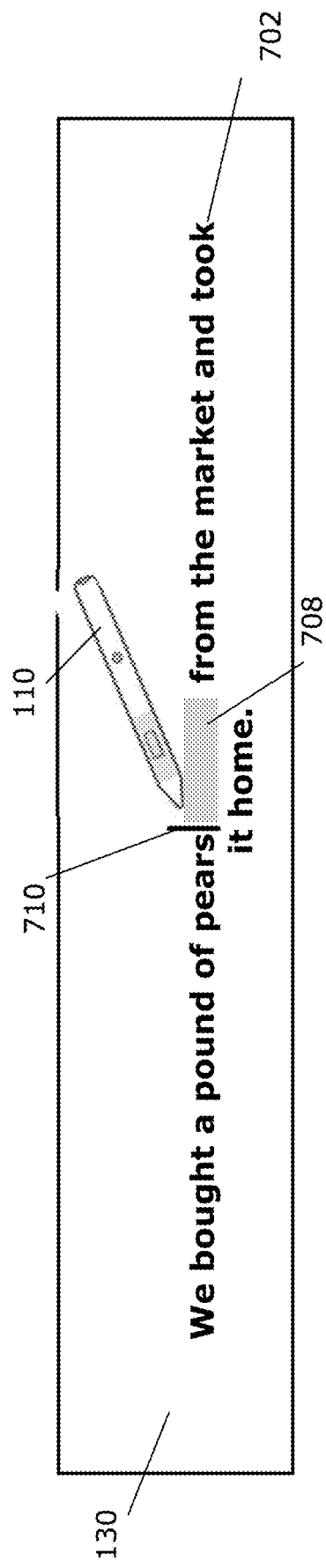
FIGS. 7A, 7B, and 7C illustrate example sentences rendered on a, in accordance with examples described herein.
Figure 7B:
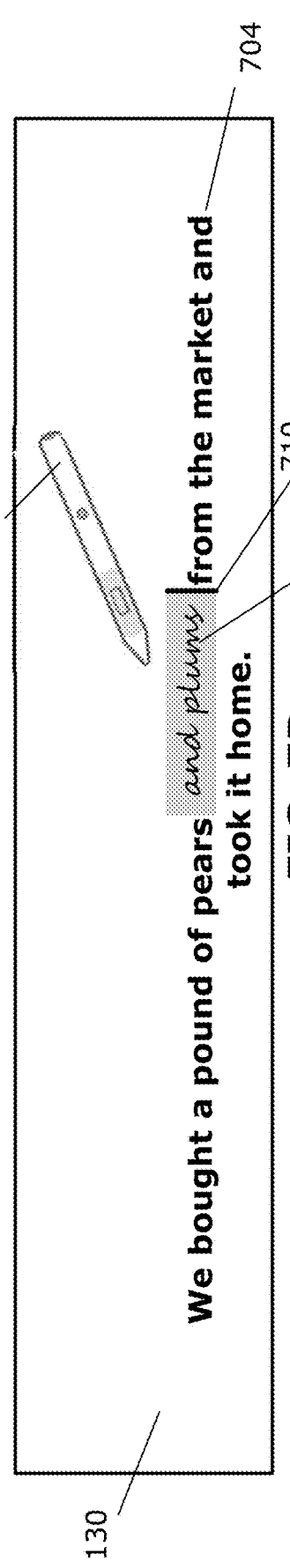
Figure 7C:
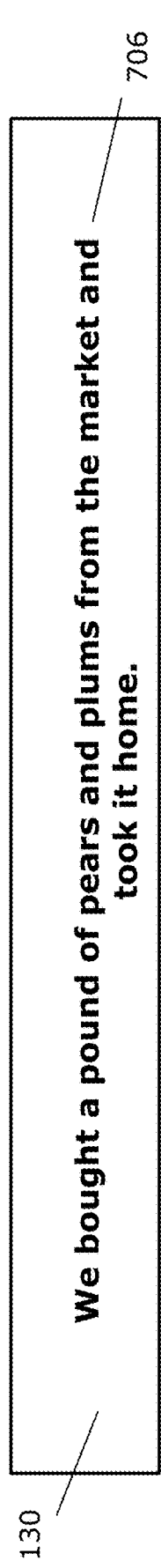

Reference is now made to FIGS. 7A, 7B, and 7C, which illustrate an example implementation of a method of the present disclosure following an activation of handwriting recognition. Each of FIGS. 7A, 7B, and 7C include an example sentence comprising textual content as may be rendered at a touchscreen.

FIG. 7A illustrates the example sentence 702: "We bought a pound of pears from the market and took it home" rendered upon the touchscreen 130. An editing cursor 710 is shown positioned after the word "pears". The editing cursor 710 may be a text editing cursor that updates its location and appearance according to a user's touch input (e.g., input using the electronic pen 110) selection and/or editing actions. The example sentence 702 includes a highlighted space 708, between the words "pears" and "from". FIG. 7A further illustrates the electronic pen 110 near the highlighted space.

The highlighted space 708 may represent a space where a user may write using the electronic pen 110, and, in some examples, may be provided by the system upon receiving touch input at a first location of the touchscreen 130.

FIG. 7B illustrates an example sentence 704 that is similar to the example sentence 702 of FIG. 7A. The example sentence 704 is displayed upon the touchscreen 130. However, the example sentence 704 of FIG. 7B further includes the handwritten phrase "and plums" upon the highlighted space 708 between the words "pears" and "from". The editing cursor 710 is shown positioned after the word "plums", indicating an updated text editing position responsive to the addition of the handwritten phrase. FIG. 7B further illustrates the electronic pen 110 near the highlighted space 708. As shown, a user may use the electronic pen 110 to edit a series of textual content on the touchscreen 130.

FIG. 7C illustrates the example sentence 706, "We bought a pound of pears and plums from the market and took it home" displayed upon the touchscreen 130. The example sentence 706 is entirely rendered with textual content, illustrating the conversion, by the system, of touch editing representing handwriting into rendered textual content corresponding to the handwriting.

Figure 8:
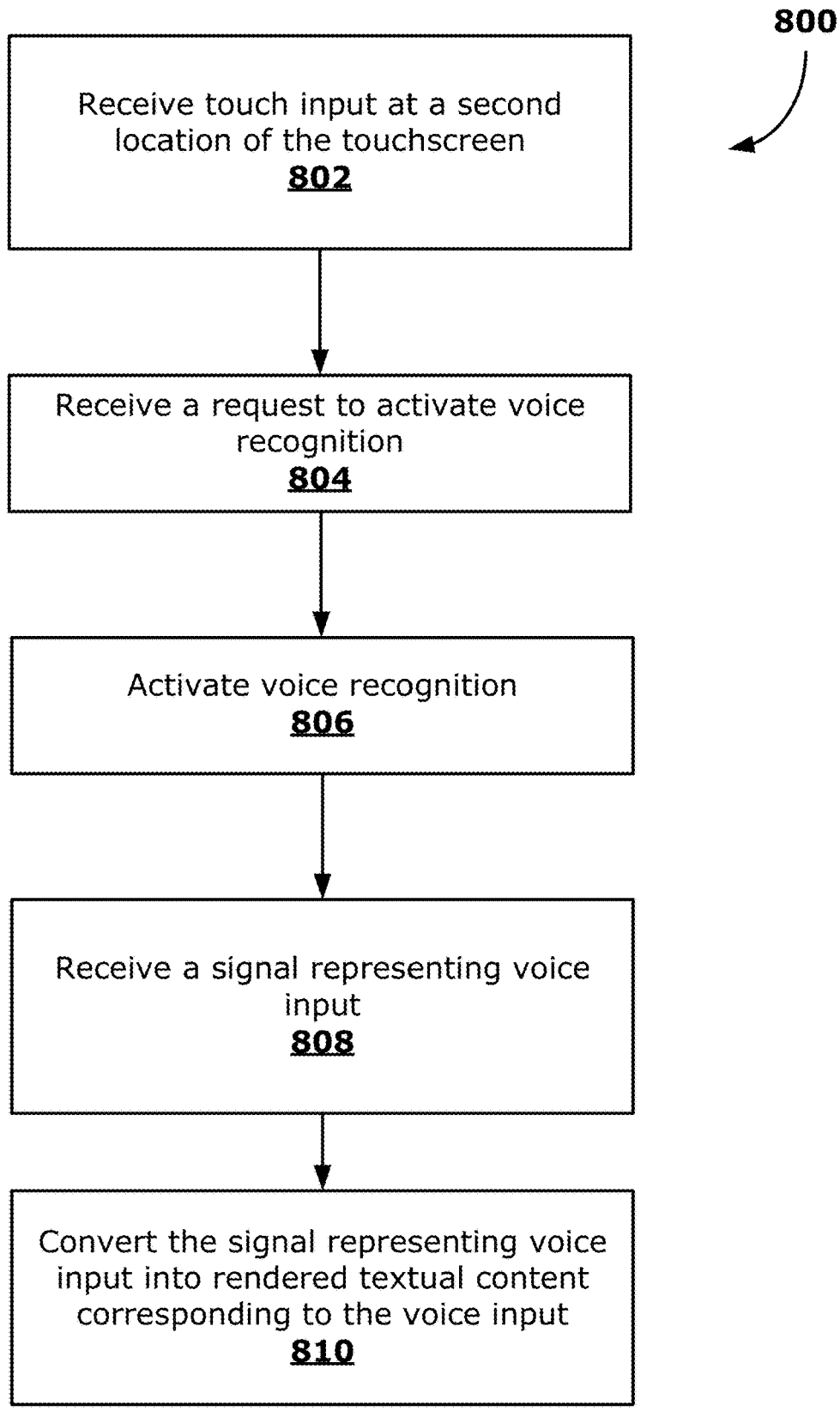
FIG. 8 is a flowchart of an example method of text editing, in accordance with examples described herein.

FIG. 8 is a flowchart of an example method 800 of text editing, in accordance with an embodiment of the present disclosure. The method 800 may be performed by one or more processors of a computing system, such as the one or more processors of the touchscreen device 140 (FIG. 1).

At the operation 802, the system receives touch input at a second location of the touchscreen 130 (FIG. 1).

At the operation 804, the system receives a request to activate voice recognition. In some embodiments, the request to activate voice recognition may be received from the electronic pen 110 (FIG. 1). For example, in some embodiments, the request to activate voice recognition may be received as pressure signals indicating a detection of a second amount of pressure at the pen tip 160 (FIG. 1). In some implementations, the second amount of pressure may be distinguishable from the first amount of pressure. For example, a user of the electronic pen may provide a first amount of pressure at the pen tip. The first amount of pressure may be indicative of a request to activate handwriting recognition. A user of the electronic pen may then provide a second amount of pressure at the pen tip, the second amount of pressure being distinguishable from the first amount of pressure. The second amount of pressure may be indicative of a request to activate voice recognition. In some implementations, for example, a lesser amount of pressure at the pen tip may indicate a request to activate voice recognition, and a greater amount of pressure may indicate a request to activate handwriting recognition. In some implementations, "lesser" and "greater" amounts of pressure may be distinguished from each other by comparing the pressure measured by the pressure sensor to a predefined threshold. For example, pressure above a first threshold but below a second threshold may be distinguished as a "lesser" amount of pressure that activates voice input, and pressure above the second threshold may be distinguished as a "greater" amount of pressure that activates handwriting input. As another example, pressure above a first threshold but below a second threshold may be distinguished as a "greater" amount of pressure that activates handwriting input, and pressure above the second threshold may be distinguished as a "lesser" amount of pressure that activates voice input.

In some embodiments where the electronic pen includes a button, the request to activate voice recognition may be received as an input signal indicating a button press at the electronic pen. For example, a user of the electronic pen may provide a button press and the button press may be indicative of a request to activate voice activation.

In some embodiments where the electronic pen does not include a button, the request to activate voice recognition may be received as an input signal indicating a "long press" by the electronic pen. The "long press" may be determined by the electronic pen and/or by the touchscreen device. For example, a long press threshold, representing a period of time, may be implemented. In some such examples, a request to activate voice recognition may be received when a first amount of pressure at the pen tip is detected to have been sustained for a period of time equal to or greater than the long press threshold.

In some embodiments, the request to activate voice recognition may be received via a user interface (UI) Contextual Input button. For example, in some embodiments, a user of the electronic pen may provide a first amount of pressure at the pen tip. The first amount of pressure may be indicative of a request to activate voice recognition and/or to display a UI. The UI may include one or more buttons, and may include, for example, a UI Contextual Voice Input button, which, when tapped, may activate voice recognition. The UI Contextual Input button may provide accessibility to users, for example, to those users who may have difficulty applying varying or greater amounts of pressure at the pen tip.

At the operation 806, the system activates voice recognition.

At the operation 808, the system receives a signal representing voice input. The signal may be received by the touchscreen device microphone 150. Additionally or alternatively, the signal may be received by the electronic pen microphone 180 and communicated by the electronic pen 110 to the touchscreen device 140.

At the operation 810, the system converts the signal representing voice input into rendered textual content corresponding to the voice input. In some implementations, the textual content may be rendered at the second location of the touchscreen. For example, in some implementations, the system may send a representation of the signal representing voice input to a Speech Recognition engine to convert the representation of the signal representing voice input to computer-renderable text. The Speech Recognition engine may be located, for example, on the computing system. Alternatively or additionally, the Speech Recognition engine may be a service, such as a cloud service or may reside on a remote system. The Speech Recognition engine may employ NLP neural networks. The system may receive the computer-renderable text from the Speech Recognition engine, and may display the computer-renderable text as textual content on the touchscreen.

Reference is now made to FIGS. 9A, 9B, and 9C, which illustrate an example implementation of a method of the present disclosure following an activation of voice recognition. Each of FIGS. 9A, 9B, and 9C include an example sentence comprising textual content as may be rendered at a touchscreen.

FIG. 9A illustrates the example sentence 902, "We bought a pound of pears from the market and took it home" rendered upon the touchscreen 130. A microphone icon 908 and an electronic pen 110 are illustrated near a second location of the touchscreen 130, between the words "pear" and "from". In this example illustration, the microphone icon 908 represents the activation of voice recognition. The microphone icon 908 may also represent a voice cursor, indicating a position on the touchscreen 130 where voice dictation may be rendered.

FIG. 9B illustrates an example sentence 904 that is similar to the example sentence 902 of FIG. 9A. However, the example sentence 904 includes a highlighted space 708 between the words "pear" and "from". The microphone icon 908 is illustrated near the second location of the touchscreen, as in FIG. 9A. FIG. 9B further includes the typed phrase "and plums" upon the highlighted space 708, which has been received by the system via a signal representing voice input.

FIG. 9C illustrates the example sentence 706, "We bought a pound of pears and plums from the market and took it home". The example sentence is entirely rendered with textual content, illustrating the conversion, by the system, of a signal representing voice input into rendered textual content corresponding to the voice input.

Figure 10:
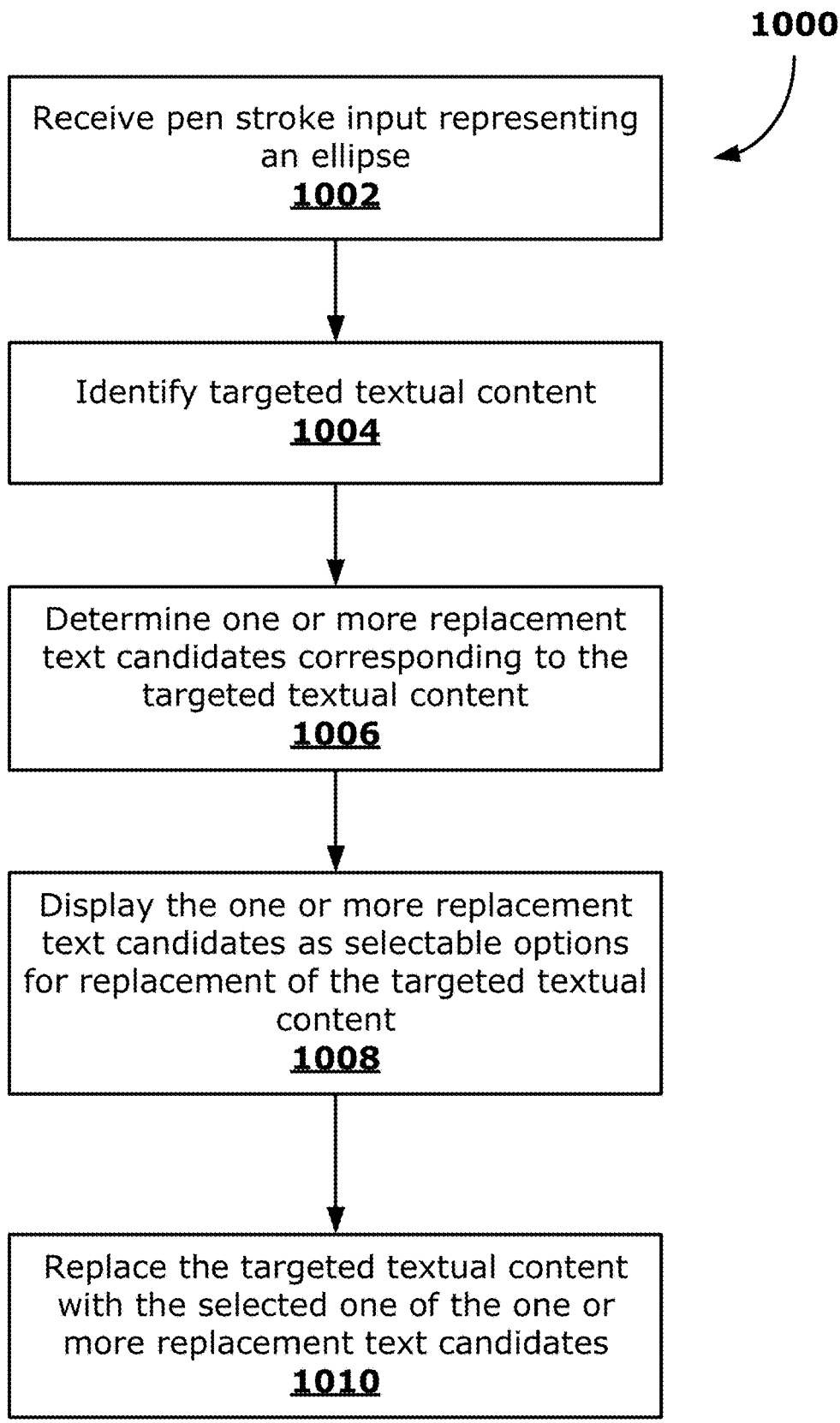
FIG. 10 is a flowchart of an example method of text editing, in accordance with examples described herein.

FIG. 10 is a flowchart of an example method 1000 of text editing, in accordance with an embodiment of the present disclosure. The method 1000 may be performed by one or more processors of a computing system, such as the one or more processors of the touchscreen device 140 (FIG. 1).

At the operation 1002, the system receives touch input representing an ellipse at a third location of the touchscreen 130 (FIG. 1).

At the operation 1004, the system identifies targeted textual content. The targeted textual content may be content rendered at the third location of the touchscreen. The targeted textual content may represent textual content that has been encircled by the touch input representing the ellipse.

Figure 11A:
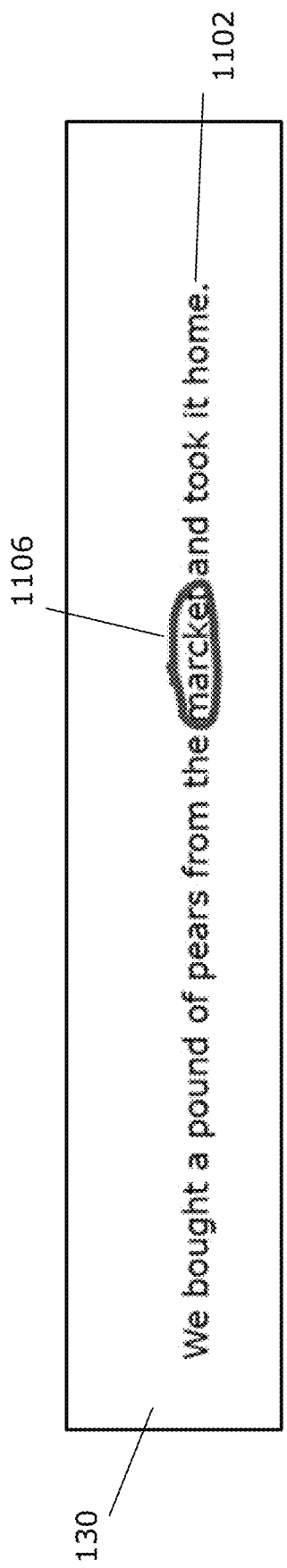
FIGS. 11A and 11B illustrate example sentences comprising textual content as may be rendered at a touchscreen, in accordance with examples described herein.
Figure 11B:
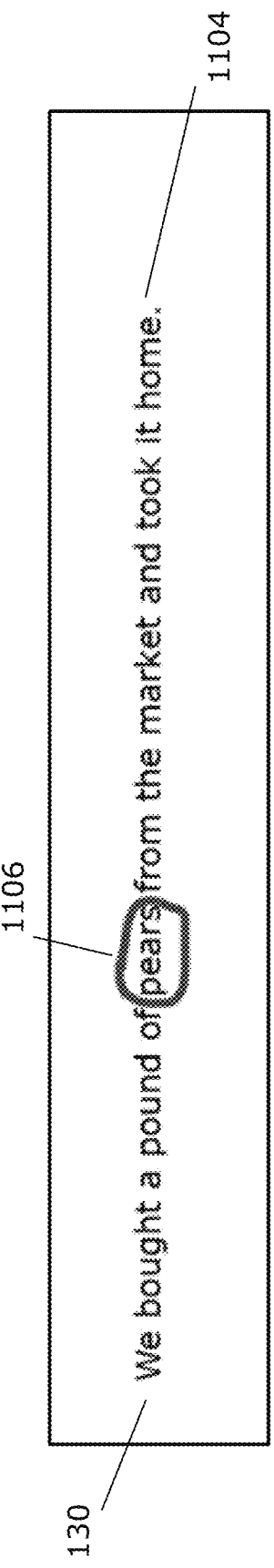

Reference is now made to FIGS. 11A and 11B. FIGS. 11A and 11B illustrate example sentences 1102, 1104 comprising textual content rendered upon the touchscreen 130. FIG. 11A recites an example sentence 1102:

"We bought a pound of pears from the marcket and took it home,"

FIG. 11B recites the example sentence 1104:

"We bought a pound of pears from the market and took it home".

FIGS. 11A and 11B each illustrate pen input representing an ellipse 1106 displayed about targeted textual content. In the example of FIG. 11A, the pen input representing the ellipse 1106 is displayed about the textual content "marcket", and in the example of FIG. 11B, the pen input representing the ellipse 1106 is displayed about the textual content "pears".

Returning to the method 1000 of FIG. 10, after the operation 1004, the operation 1006 is next.

At the operation 1006, the system determines one or more replacement candidates corresponding to the targeted textual content. For example, in some implementations, the targeted textual content may correspond to a misspelled word, such as represented by the example of FIG. 11A. In such implementations, the one or more replacement candidates may correspond to the correct spelling of the misspelled word. For example, in some implementations, the system may send a representation of the targeted textual content to a spellcheck application. The spellcheck application may be an application that is local to the system, or the spellcheck application may be a cloud-based application or may reside on a remote system, for example. The spellcheck application may determine that the targeted textual content may represent a misspelled word, and if so, may provide one or more correctly spelled words as one or more replacement candidates to the system.

As another example, the targeted textual content may correspond to a word that has one or more homonyms, such as represented by the example of FIG. 11B. In such implementations, the one or more replacement candidates may correspond to one or more homonyms of the targeted textual content. For example, in some implementations, the system may send a representation of the targeted textual content to a homonym application. The homonym application may be an application that is local to the system, or the homonym application may be a cloud-based application or may reside on a remote system, for example. The homonym application may determine that the targeted textual content may correspond to one or more homonyms, and if so, may provide the one or more homonyms as one or more replacement candidates to the system.

In some embodiments, the targeted textual content may correspond to a word that is missing capitalization, contains a grammatical error, to a word that has synonyms, and/or to punctuation for example. In such implementations, the one or more replacement text candidates may relate to a replacement candidate corresponding to a corrected version of the targeted textual content and/or to one or more synonyms of the targeted textual content. In such implementations, a corresponding application, such as a grammar application and/or a thesaurus application, may be used by the system to determine the one or more replacements candidates.

At the operation 1008, the system displays the one or more replacement text candidates as selectable options for replacement of the targeted textual content.

Reference is now made to FIG. 12A and FIG. 12B. FIGS. 12A and 12B illustrate example sentences 1102, 1104 comprising textual content rendered upon the touchscreen 130. As illustrated in corresponding drawings FIGS. 11A and 11B, pen input representing an ellipse 1106 has been displayed about textual content in each of FIGS. 12A and 12B. FIGS. 12A and 12B each display one or more replacement text candidates 1202, 1204, 1206 as selectable options for replacement of the targeted textual content. FIGS. 12A and 12B also illustrate the electronic pen 110 near the rendered textual content.

In the example of FIG. 12A, the replacement text candidate "market" 1106 is displayed as a selectable option near the encircled misspelled word "marcket". In the example of FIG. 12B, the replacement text candidates "pairs" 1204 and "pares" 1206 are displayed as selectable options near the encircled word "pears". In some implementations, for each of the examples illustrated in FIGS. 12A and 12B, a user may select one of the displayed replacement text candidates 1202, 1204, 1206. The user may make the selection using the electronic pen 110, for example.

In some examples where the targeted textual content corresponds to punctuation, replacement text candidates representing alternative punctuation may be displayed as selectable options.

Returning again to the method 1000 of FIG. 10, after the operation 1008, the operation 1010 is next.

At the operation 1010, in response to a selection of one of the one or more replacement text candidates, the system replaces the targeted textual content with the selected one of the one or more replacement text candidates. For example, with reference to FIG. 12A, the system may replace the misspelled word "marcket" with the replacement text candidate "market" 1202. As another example, with reference to FIG. 12B, the system may replace the word "pears" with either of the replacement text candidates "pairs" 1204 or "pares" 1206, according to the selection.

Figure 13:
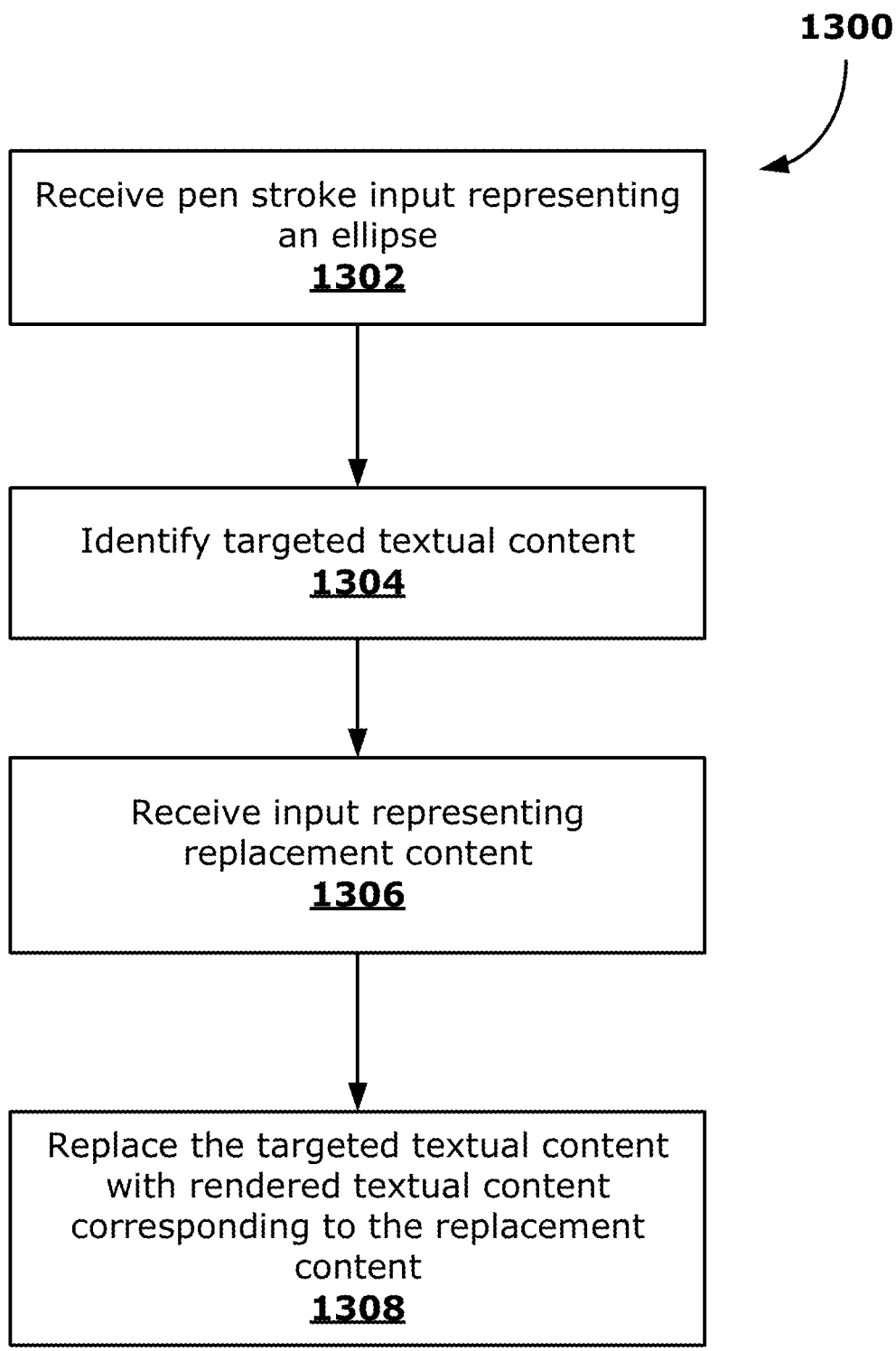
FIG. 13 is a flowchart of an example method of text editing, in accordance with examples described herein.

FIG. 13 is a flowchart of an example method 1300 of text editing, in accordance with an embodiment of the present disclosure. The method 1300 may be performed by one or more processors of a computing system, such as the one or more processors of the touchscreen device 140 (FIG. 1).

At the operation 1302, the system receives touch input representing an ellipse at a fourth location of the touchscreen 130 (FIG. 1).

At the operation 1304, the system identifies targeted textual content. The targeted textual content may be content rendered at the fourth location of the touchscreen. The targeted textual content may represent textual content that has been encircled by the touch input representing the ellipse.

Figure 14A:
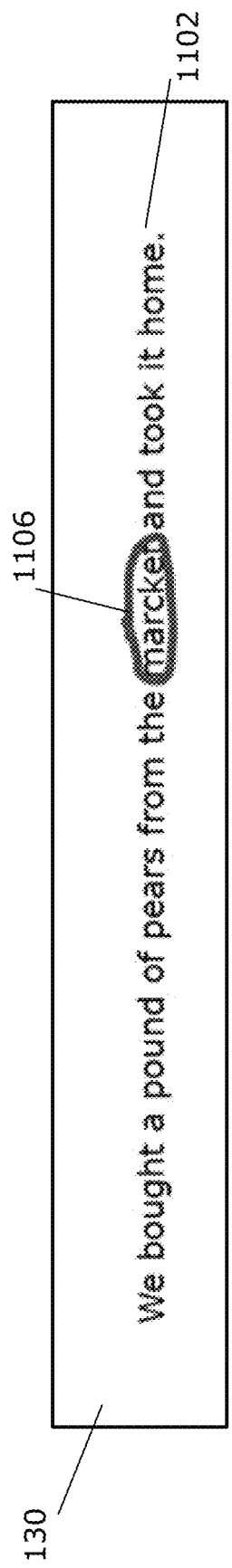

Reference is now made to FIG. 14A. FIG. 14A illustrates an example sentence 1102 comprising textual content rendered upon the touchscreen 130. The example sentence 1102 of FIG. 14A recites:

"We bought a pound of pears from the marcket and took it home."

Pen input representing an ellipse 1106 has been displayed about the misspelled word, "marcket".

Returning to FIG. 13, after the operation 1304, the operation 1306 is next.

At the operation 1306, the system receives input representing replacement content.

In some embodiments, the received input may be touch input, for example, the received input may be pen stroke input representing handwriting.

Figure 14B:
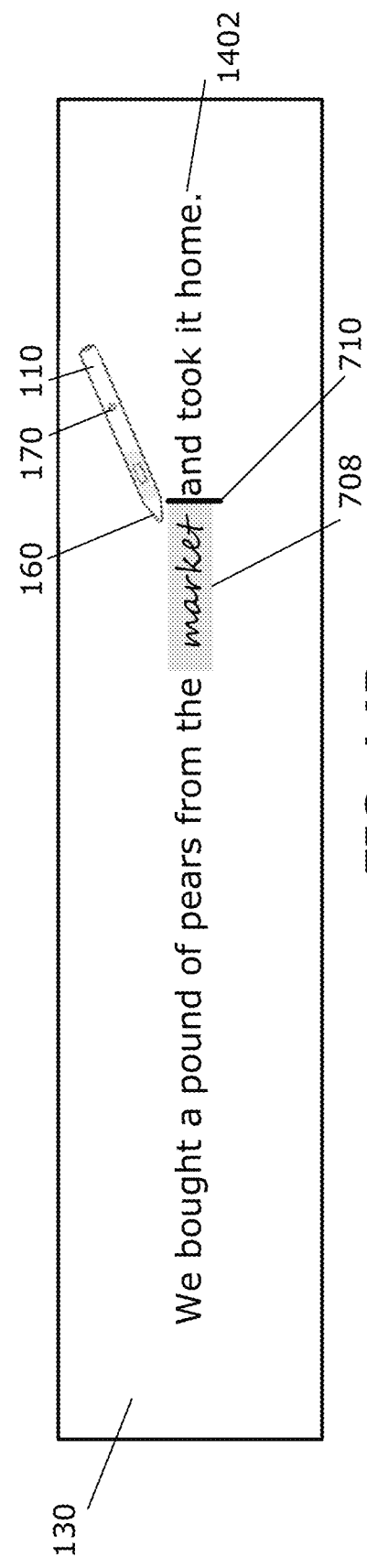

Reference is now made to FIG. 14B, which depicts an example sentence 1402 which is similar to the example sentence 1102 of FIG. 14A. The example sentence 1402 of FIG. 14B includes a rendering of touch input representing handwriting at the highlighted space 708. In the example of FIG. 14B, the rendering comprises the word "market". The editing cursor 710 is shown positioned after the word "market", indicating the location for subsequent text editing. FIG. 14B also illustrates the electronic pen 110 near the highlighted space 708.

Returning to the operation 1306 of FIG. 13, in some embodiments, the received input representing replacement content may be voice input representing dictation. The voice input may be received by the touchscreen device microphone 150 and/or by the electronic pen microphone 180 and may be communicated by the electronic pen 110 to the touchscreen device 140. In some embodiments, voice input and touch input may be operate contemporaneously, as will be discussed further with reference to FIG. 24ABCD.

Reference is now made to FIG. 14C, which illustrates an example sentence 1404. The example sentence 1402 recites: "We bought a pound of pears from the and took it home", and includes a highlighted space 708 between the words "the" and "market". FIG. 14C further includes a microphone icon 908, indicating that the system is receiving voice input. As noted, the microphone icon 908 may also represent a voice cursor, indicating a position on the touchscreen 130 where voice dictation may be rendered. In the example of FIG. 14C, the user may be dictating the word "market" to a microphone associated with the system, such as the touchscreen device microphone 150 and/or the electronic pen microphone 180.

In some examples, the highlighted space 708 represents a space where a user may write using the electronic pen 110, such as depicted in FIG. 14B. In some examples, the highlighted space 708 represents a space where rendered textual content representing voice input may be displayed. In some examples, the highlighted space 708 may appear in response to touch input received at a location of the touchscreen 130 corresponding to an indicated point of insertion. In some examples, the highlighted space 708 may appear in response to an indication to use a voice input modality (such as, for example, by pressing the button 170 on the electronic pen 110), or in response to an indication to use handwriting. As previously noted, user selection of a particular input modality (e.g., handwriting input or voice input) may be indicated by providing varying amounts of pressure at the pen tip 160.

In some embodiments, where the system may display one or more replacement text candidates 1202, 1204, 1206 as selectable options for replacement of the targeted textual content (as illustrated by FIGS. 12A and 12B), a user may forgo the selection of one or more replacement text candidates 1202, 1204, 1206. In some such embodiments, the highlighted space 708 may appear at a location of the touchscreen 130 in response to an indication to use handwriting and/or voice input. As noted, an indication to use handwriting and/or voice input may be received, for example, as a pressure signal indicating a detection of an amount of pressure at the pen tip 160, and/or as an input signal indicating a button press at the button 170 (FIG. 14B) of the electronic pen 110.

Returning to the method 1300 of FIG. 13, after the operation 1306, the operation 1308 is next.

At the operation 1308, the system replaces the targeted content with rendered textual content corresponding to the replacement content.

In some examples where the received input is touch input representing handwriting, the system may send a representation of the touch input representing handwriting to a Pen Stroke Recognition engine to convert the handwriting to computer-renderable textual content. The Pen Stroke Recognition engine may be located, for example, on the computing system. Additionally or alternatively, the Pen Stroke Recognition engine may be a cloud service or may reside on a remote system. The Pen Stroke Recognition engine may utilize OCR and/or NLP neural networks to convert the handwriting to computer-renderable textual content. In some implementations, the system may receive the computer-renderable textual content from the Pen Stroke Recognition engine, and may subsequently display the computer-renderable textual content as textual content on the touchscreen.

In some examples where the received input is voice input representing dictation, the system may send a representation of the voice input to a Speech Recognition engine to convert the representation of the voice input to computer-renderable textual content. In some embodiments, the Speech Recognition engine may be local to the computing system. In other embodiments, the Speech Recognition engine may be a service, such as a cloud service or may reside on a remote system. The Speech Recognition engine may employ NLP neural networks. In some implementations, the system may receive the computer-renderable textual content from the service, and may display the computer-renderable textual content as textual content on the touchscreen.

Reference is now made to FIG. 14D, which illustrates an example sentence 1406 displayed on the touchscreen 130. The example sentence 1402 recites:

"We bought a pound of pears from the market and took it home."

Example sentence 1406 depicts the resulting displayed textual content subsequent to the system receiving voice input, as illustrated by FIG. 14C or subsequent to receiving touch input representing handwriting, as illustrated by FIG. 14B.

Figure 15:
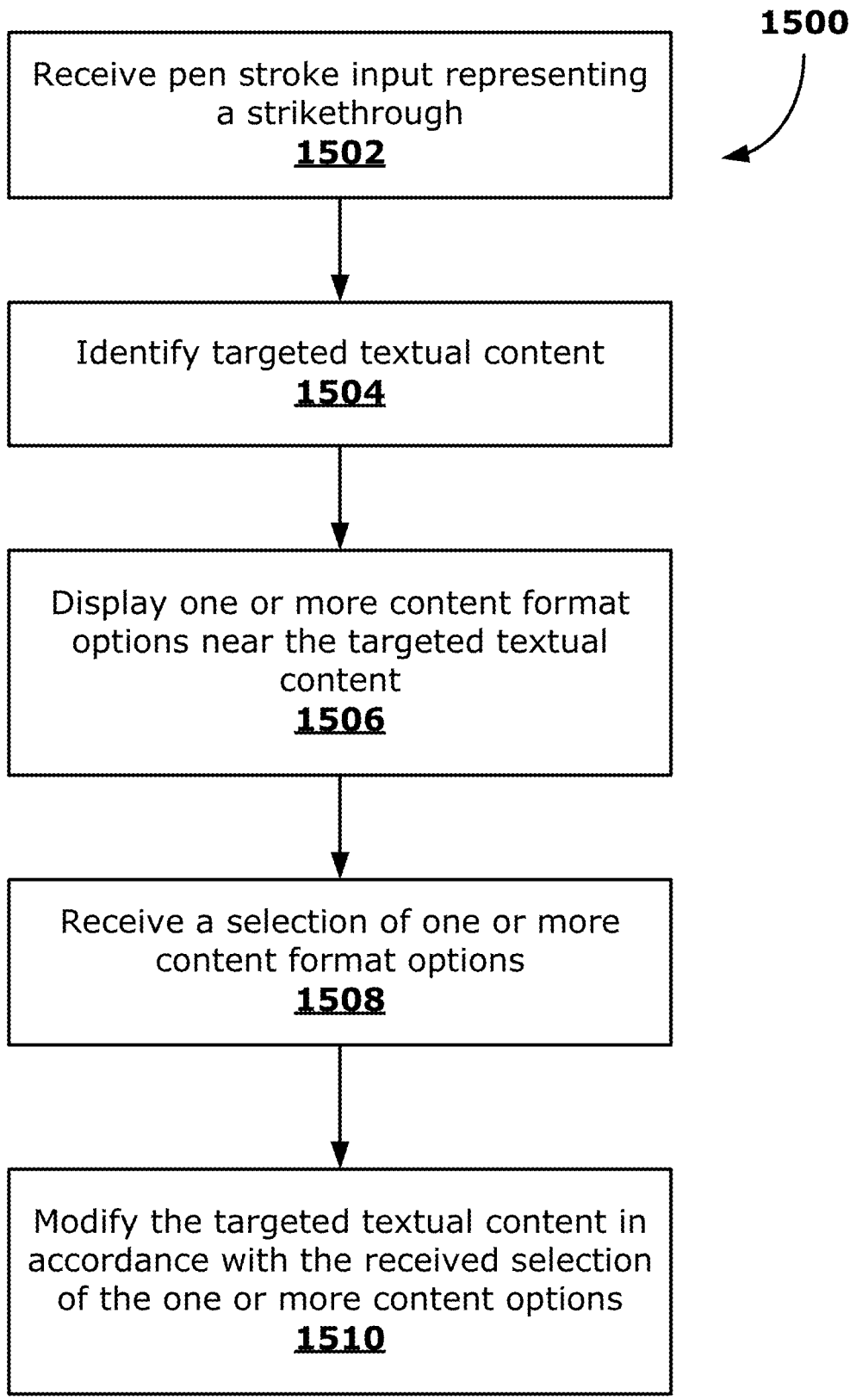
FIG. 15 is a flowchart of an example method of text editing, in accordance with examples described herein.

FIG. 15 is a flowchart of an example method 1500 of text editing, in accordance with an embodiment of the present disclosure. The method 1500 may be performed by one or more processors of a computing system, such as the one or more processors of the touchscreen device 140 (FIG. 1).

At the operation 1502, the system receives touch input representing a strikethrough at a fifth location of the touchscreen 130 (FIG. 1).

At the operation 1504, the system identifies targeted textual content. The targeted textual content may be content rendered at the fifth location of the touchscreen. The targeted textual content may represent textual content rendered beneath the touch input representing a strikethrough.

At the operation 1506, the system displays one or more content format options near the targeted textual content.

Figure 16A:
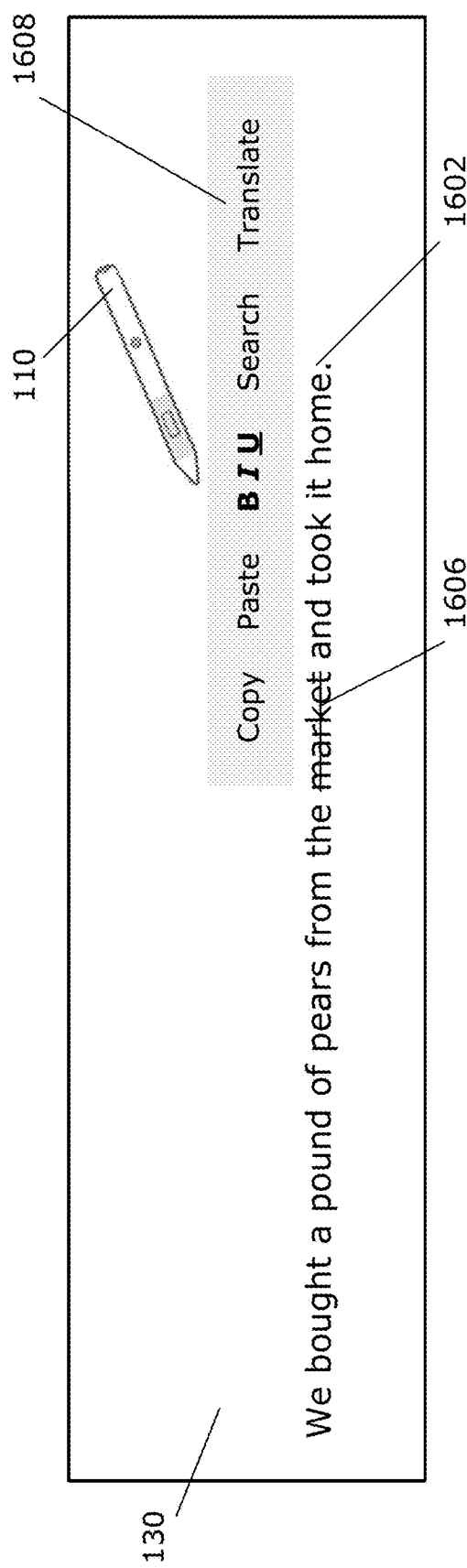
FIGS. 16A and 16B illustrate example sentences comprising textual content as may be rendered at a touchscreen, in accordance with examples described herein.

Reference is now made to FIG. 16A, which illustrates an example sentence 1602 comprising textual content as may be rendered at the touchscreen 130. The example sentence 1602 recites, "We bought a pound of pears from the market and took it home"

In this example, the targeted textual content is the word "market", which is displayed with a strikethrough 1606 there through. A selection 1608 of a plurality of content format options are displayed near the targeted textual content. In the example of FIG. 16A, the displayed selection 1608 of content format options includes "Copy", "Paste", "B I U" (representing the options to highlight with bold font, to highlight with italicized font, and to highlight with underline), "Search" and "Translate".

Reference is again made to FIG. 15. At the operation 1508, the system receives a selection of the one or more content options. For example, the system may receive a selection of the content format option "B", representing the option to highlight with bold font).

At the operation 1510, the system modifies the targeted textual content in accordance with the received selection of the one or more content options.

Figure 16B:
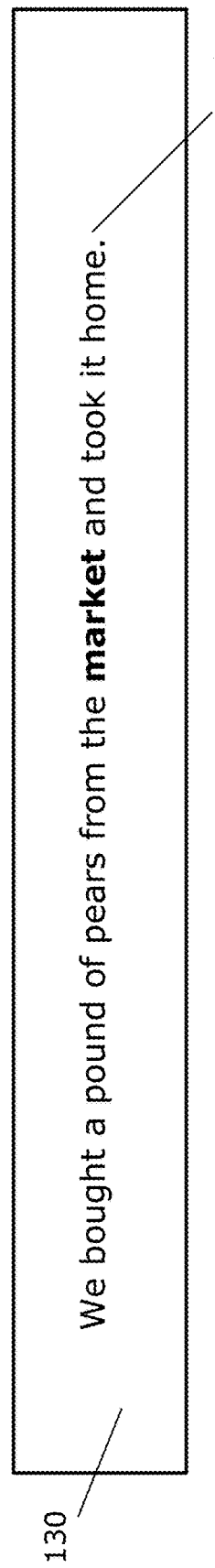

For example, reference is now made to FIG. 16B, which illustrates an example sentence 1604 as displayed upon the touchscreen 130. As shown in FIG. 16B, upon receiving the selection of the content format option "B", the system may highlight the word "market" in bold font. The resulting example sentence 1604, in which the word "market" is highlighted in bold, recites as follows:

"We bought a pound of pears from the market and took it home."

Figure 17:
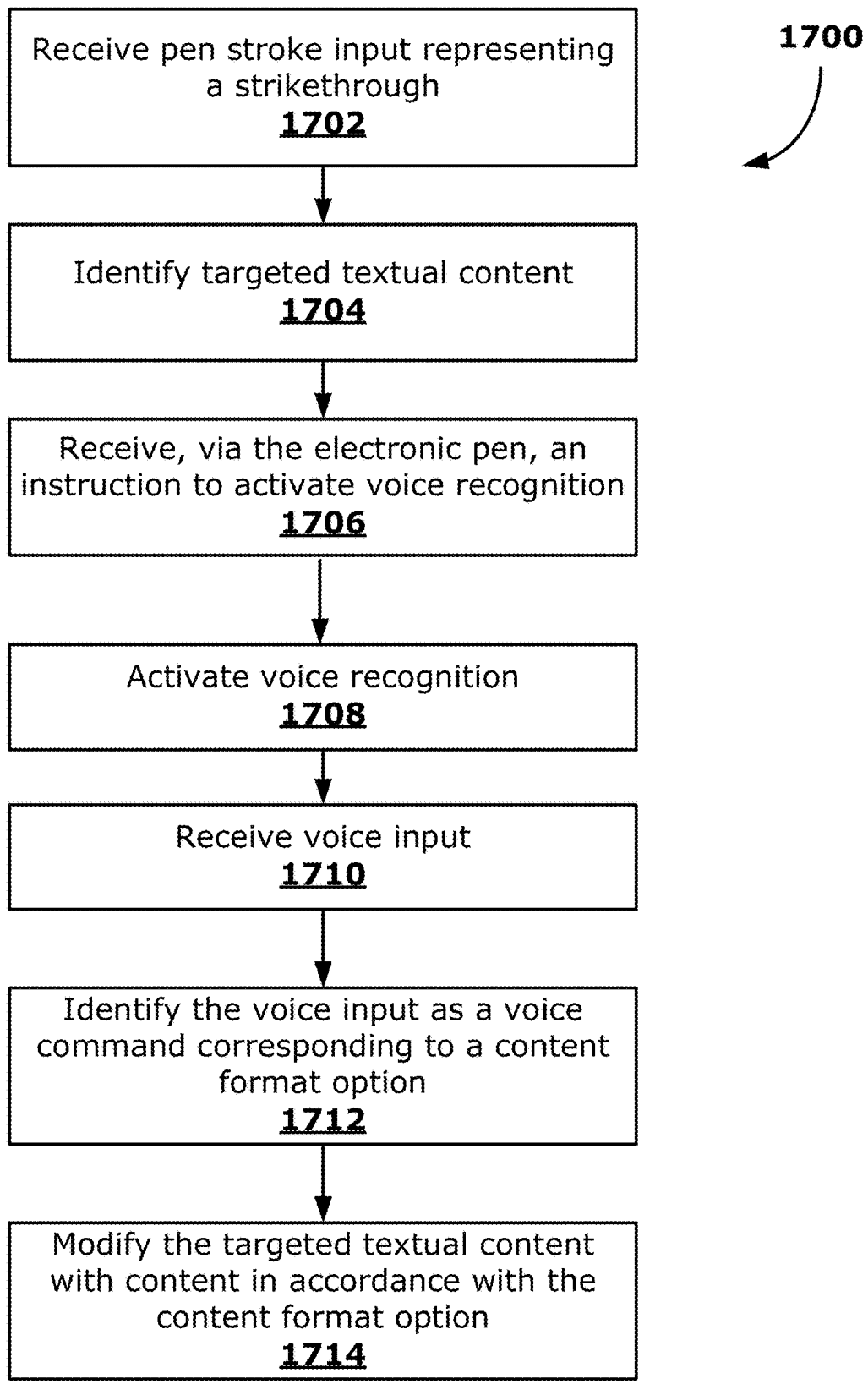
FIG. 17 is a flowchart of an example method of text editing, in accordance with examples described herein.

FIG. 17 is a flowchart of an example method 1700 of text editing, in accordance with an embodiment of the present disclosure. The method 1700 may be performed by one or more processors of a computing system, such as the one or more processors of the touchscreen device 140 (FIG. 1).

At the operation 1702, the system receives touch input representing a strikethrough at a seventh location of the touchscreen 130 (FIG. 1).

At the operation 1704, the system identifies targeted textual content. The targeted textual content may be content rendered at the seventh location of the touchscreen. The targeted textual content may represent textual content rendered beneath the touch input representing a strikethrough.

At the operation 1706, the system receives, via the electronic pen, an instruction to activate voice recognition. In some embodiments, the instruction may be received via pressure signals representing an amount of pressure at the pen tip. In some embodiments, the instruction may be received as an input signal indicating a button press at the electronic pen.

In some embodiments where the electronic pen does not include a button, the instruction to activate voice recognition may be received as an input signal indicating a "long press" by the electronic pen. The "long press" may be determined by the electronic pen and/or by the touchscreen device. For example, a long press threshold, representing a period of time, may be implemented. In some such examples, an instruction to activate voice recognition may be received when a first amount of pressure at the pen tip is detected to have been sustained for a period of time equal to or greater than the long press threshold.

In some examples, an indication to use pen stroke input may be received as pressure signals indicating a first amount of pressure at the pen tip, for example, at a location of the touchscreen. In some examples, an indication to use voice input may be received as an input signal indicating a button press at the button, or as pressure signals indicating a detection of a second amount of pressure at the pen tip, for example, at a location of the touchscreen. In some embodiments, voice input and touch input may be operate contemporaneously, as will be discussed further with reference to FIG. 24ABCD.

At the operation 1708, the system activates voice recognition.

At the operation 1710, the system receives voice input. The voice input may be received via a microphone in communication with the processor. In some embodiments, the microphone may be a component of the computer system. In some embodiments, the microphone may be a component of the electronic pen.

Figure 18A:
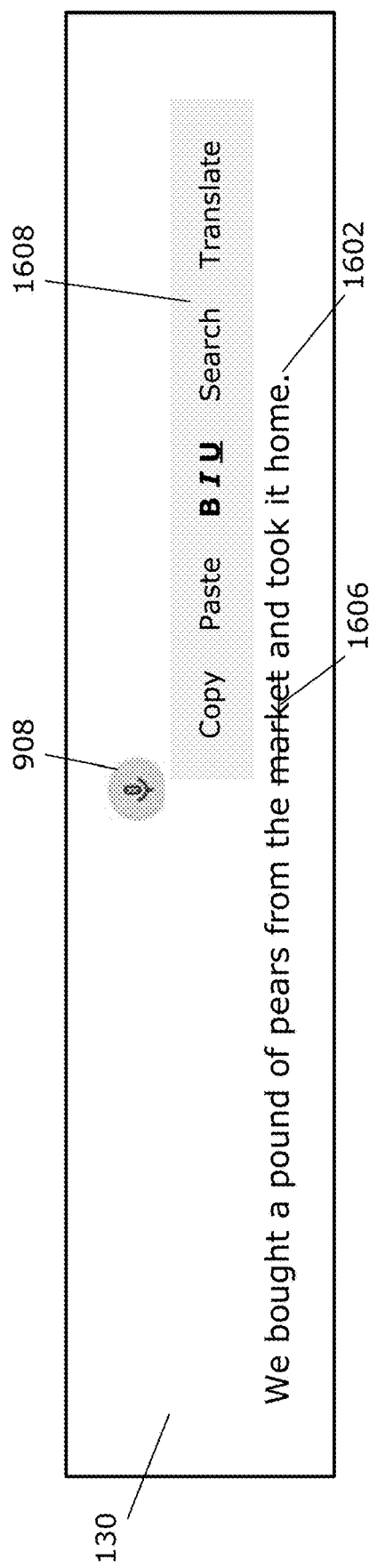
FIGS. 18A and 18B illustrate example sentences comprising textual content as may be rendered at a touchscreen, in accordance with examples described herein.

Reference is now made to FIG. 18A, which illustrates the example sentence 1602 comprising textual content as may be rendered at the touchscreen 130. The example sentence 1602 recites, "We bought a pound of pears from the ~~market~~ and took it home"

In this example, the targeted textual content is the word "market", which is displayed with a strikethrough 1606 there through. A selection 1608 of a plurality of content format options are displayed near the targeted textual content. In the example of FIG. 18A, the selection 1608 of the plurality of content format options are "Copy", "Paste", "B I U" (representing the options to highlight with bold font, to highlight with italicized font, and to highlight with underline), "Search" and "Translate". A microphone icon 908 is displayed near the word "market", indicating that voice recognition has been activated. As noted, the microphone icon 908 may also represent a voice cursor, indicating a position on the touchscreen 130 where voice dictation may be rendered.

Returning to FIG. 17, at the operation 1712, the system identifies the voice input as a voice command corresponding to a content format option. In some implementations, examples of the content format option may include "Bold", "Highlight", "Italicize", "Underline" or "Delete", for example. In some examples, the voice command may correspond to one of the displayed content format options of selection 1608 of the plurality of content format options. In some examples, the voice command may not correspond to one of the displayed content format options of selection 1608 of the plurality of content format options.

For example, in some implementations, the system may send a signal representing voice input to a Speech Recognition engine that processes the voice input using, for example, a voice recognition algorithm. The Speech Recognition engine may employ NLP neural networks. In some examples, the Speech Recognition engine may be local to the computing system. In other examples, the Speech Recognition engine may be a service, such as a cloud service, or may reside on a remote system. In some examples, the Speech Recognition engine may determine that the voice input corresponds to a voice command. In some examples, the Speech Recognition engine or the system may then compare the voice command to a set of pre-defined voice commands to determine the action requested by the voice command. The system may then execute that action.

Figure 18B:
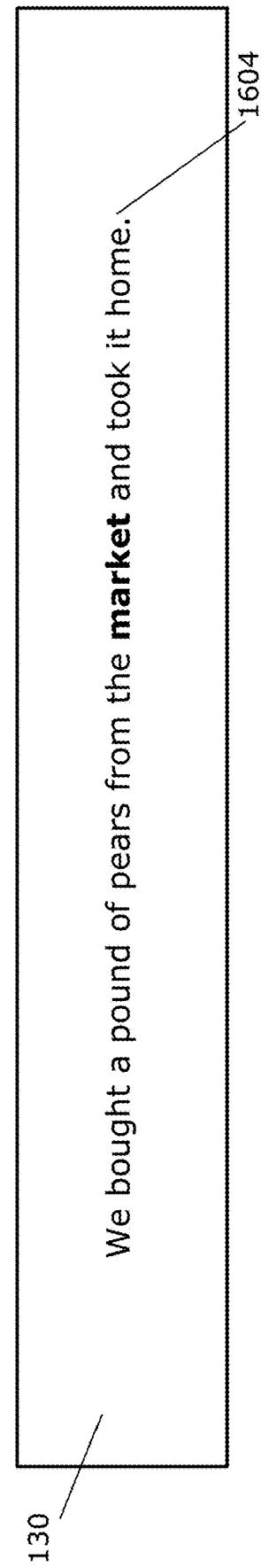

At the operation 1714, the system modifies the targeted textual content in accordance with the content format option. For example, in response to identifying the voice command "Bold", the system may highlight the targeted textual content in bold, as shown in the example sentence 1604 of FIG. 18B. FIG. 18B illustrates the following example sentence 1604 displayed on the touchscreen 130:

"We bought a pound of pears from the market and took it home."

The word "market" is highlighted in bold in this sentence. It may be noted that the same targeted textual content may be modified using multiple different voice commands, in some examples without requiring the user to repeat selection of the same targeted textual content. For example, after the word "market" has been formatted according to the voice command "Bold", the word "market" may remain the targeted textual content (e.g., indicated by remaining highlighted and/or the content format options remaining displayed). Further voice input and/or touch input may be provided to modify the same targeted textual content further (e.g., to add additional formatting). The targeted textual content may remain targeted until the user provides other input (e.g., touch input) at a different location, for example.

Figure 19:
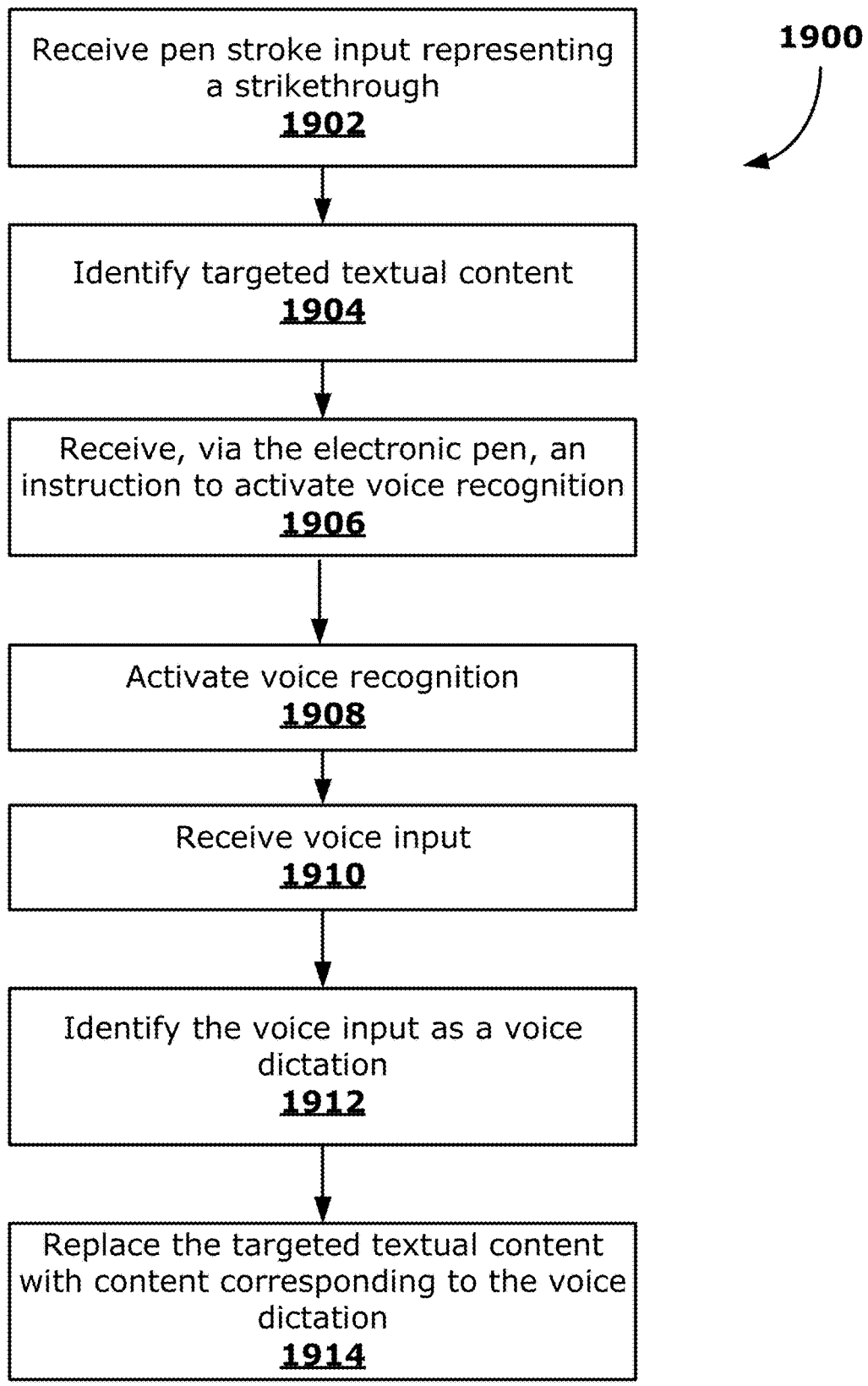
FIG. 19 is a flowchart of an example method of text editing, in accordance with examples described herein.

FIG. 19 is a flowchart of an example method 1900 of text editing, in accordance with an embodiment of the present disclosure. The method 1900 may be performed by one or more processors of a computing system, such as the one or more processors of the touchscreen device 140 (FIG. 1).

At the operation 1902, the system receives touch input representing a strikethrough at an eighth location of the touchscreen 130 (FIG. 1).

At the operation 1904, the system identifies targeted textual content. The targeted textual content may be content rendered at the eighth location of the touchscreen. The targeted textual content may represent textual content rendered beneath the touch input representing a strikethrough.

At the operation 1906, the system receives, via the electronic pen, an instruction to activate voice recognition. In some embodiments, the instruction may be received via pressure signals representing an amount of pressure at the pen tip. In some embodiments, the instruction may be received as an input signal indicating a button press at the electronic pen.

In some embodiments, where the system may display one or more content format options (as illustrated by FIGS. 16A and 18A), a user may forgo the selection of the one or more content format options. Instead, an indication to use handwriting and/or voice input may be received by the system, and as a result, a highlighted space may appear at a location of the touchscreen. As noted, an indication to use handwriting and/or voice input may comprise, for example, receiving pressure signals indicating an amount of pressure at the pen tip and/or receiving an input signal indicating a button press at the button.

At the operation 1908, the system activates voice recognition.

At the operation 1910, the system receives voice input. The voice input may be received via a microphone in communication with the processor. In some embodiments, the microphone may be a component of the computer system. In some embodiments, the microphone may be a component of the electronic pen.

Figure 20A:
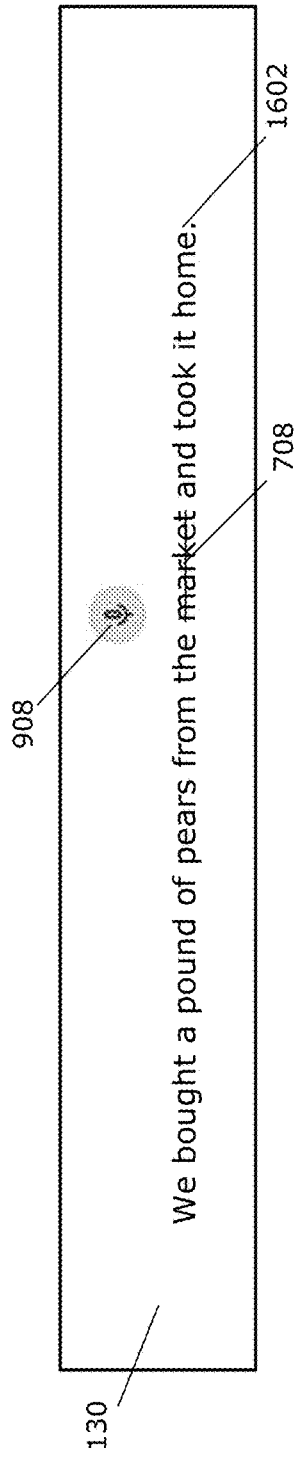
FIGS. 20A, 20B, and 20C illustrate example sentences comprising textual content as may be rendered at a touchscreen, in accordance with examples described herein.

Reference is now made to FIG. 20A, which illustrates the example sentence 1602 comprising textual content as may be rendered at the touchscreen 130. The example sentence 1602 recites, "We bought a pound of pears from the market and took it home"

In this example, the targeted textual content is the word "market", which is displayed with a strikethrough 1606 there through. A microphone icon 908 is displayed near the word "market", indicating that voice recognition has been activated. As noted, the microphone icon 908 may also represent a voice cursor, indicating a position on the touchscreen 130 where voice dictation may be rendered.

Returning to FIG. 19, at the operation 1912, the system identifies the voice input as a voice dictation.

For example, in some implementations, the system may send a signal representing voice input to a Speech Recognition engine that processes the voice input using, for example, a voice recognition algorithm. The Speech Recognition engine may employ NLP neural networks. In some examples, the Speech Recognition engine may be local to the computing system. In other examples, the Speech Recognition engine may be a service, such as a cloud service, or may reside on a remote system. In some examples, the Speech Recognition engine may determine that the voice input corresponds to a voice dictation, and may subsequently convert the representation of the signal representing voice input to computer-renderable textual content. In some examples, the system may receive the computer-renderable textual content from the Speech Recognition engine, and may display the computer-renderable textual content as textual content on the touchscreen.

At the operation 1914, the system replaces the targeted textual content with content corresponding to the voice dictation.

Figure 20B:
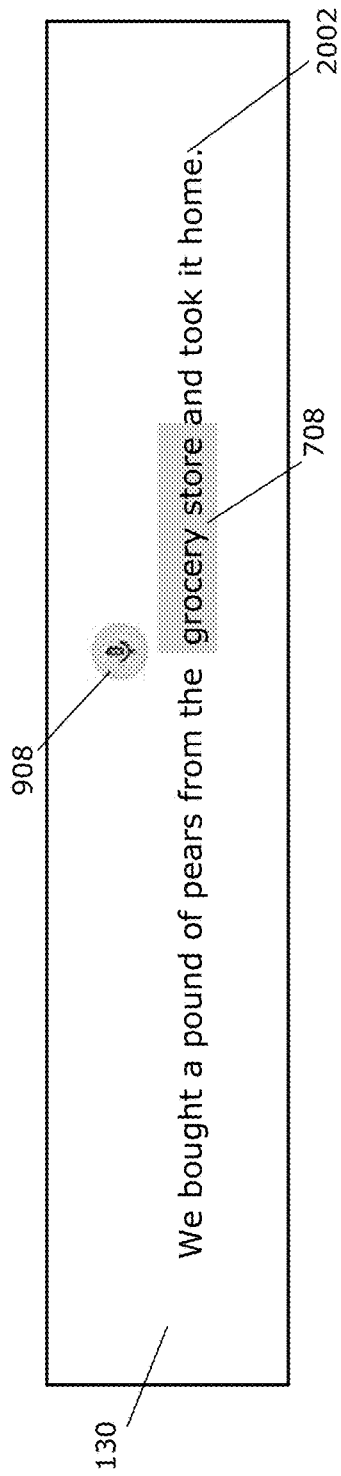

Reference is now made to FIG. 20B, which illustrates an example sentence 2002 comprising textual content as may be rendered at the touchscreen 130. The example sentence 2002 recites, "We bought a pound of pears from the grocery store and took it home"

In this example, a highlighted space 708 is illustrated beneath the phrase "grocery store". A microphone icon 908 is displayed near the phrase "grocery store", indicating that voice recognition has been activated. As noted, the microphone icon 908 may also represent a voice cursor, indicating a position on the touchscreen 130 where voice dictation may be rendered. The phrase "grocery store" represents rendered content corresponding to the voice dictation that has replaced the targeted textual content, "market".

Figure 20C:
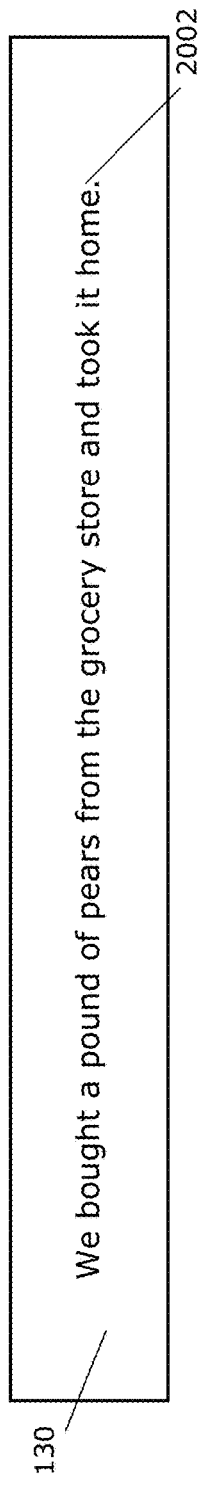

After the voice input has ceased, the sentence may appear as illustrated by FIG. 20C. FIG. 20C recites the following example sentence 2002:

"We bought a pound of pears from the market and took it home."

In the example of FIG. 20C, the example sentence 2002 is displayed on the touchscreen 130. The microphone icon 908 and the highlighted space 708 are not shown in FIG. 20C.

In some embodiments, there may be multiple ways for the system to determine that the voice input has ceased. For example, a voice input timeout threshold may be implemented. In such examples, once voice input has commenced, the system may determine that voice input has ceased after a period of voice inactivity has been received, the period of voice inactivity being equal to or greater than the voice input timeout threshold. In some embodiments, the voice input timeout threshold may be adjustable by the user.

Additionally or alternatively, the user may indicate a cessation of voice input by taking certain actions. For example, the user may "turn off" voice input using an associated UI element displayed on the touchscreen 130. As a further example, the user may take an action using the electronic pen, such as, for example, applying a certain amount of pressure to the touchscreen using the electronic pen, double tapping with the electronic pen, short pressing the electronic pen button, and/or pressing a certain button on an associated physical keyboard.

Figure 21:
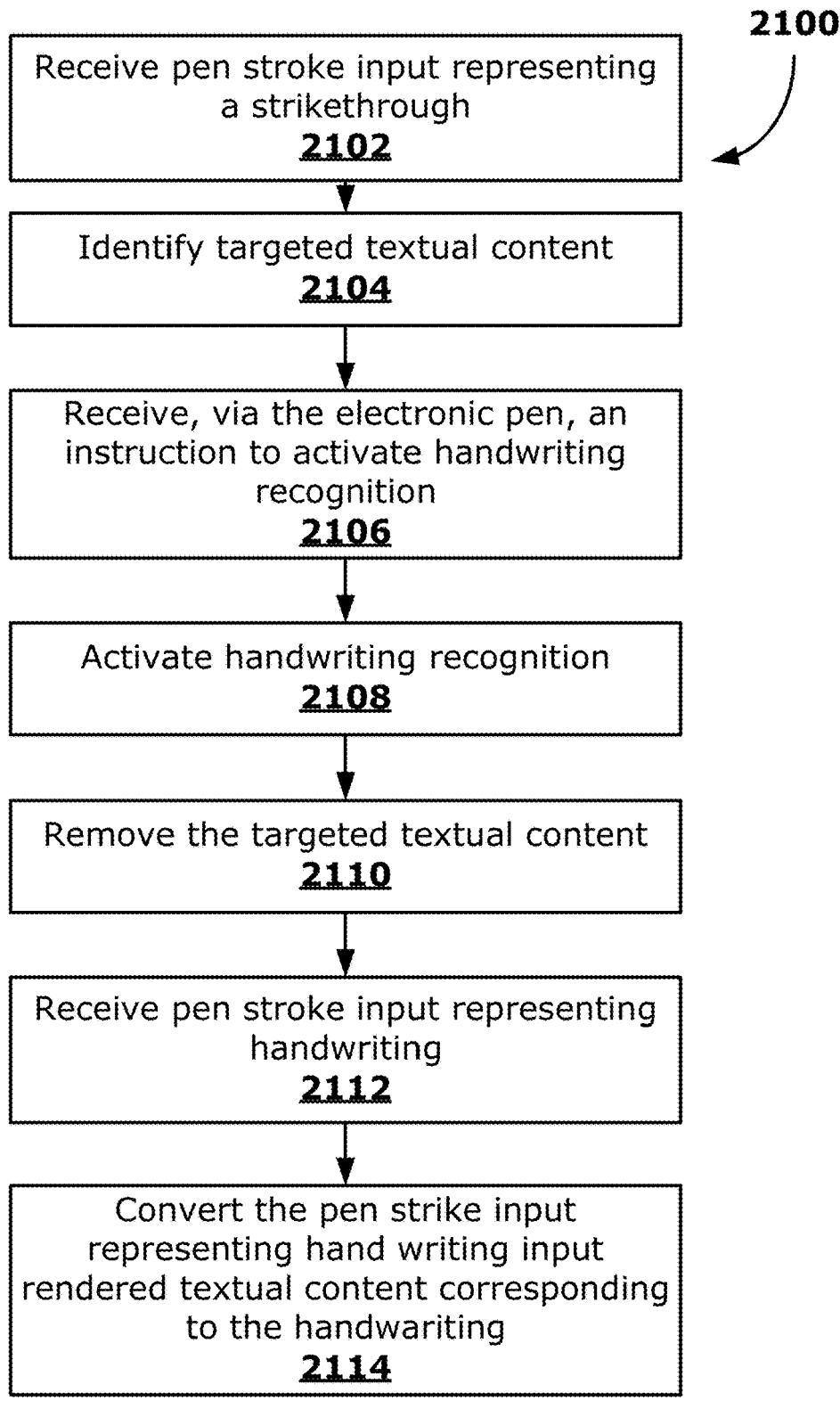
FIG. 21 is a flowchart of an example method of text editing, in accordance with examples described herein.

FIG. 21 is a flowchart of an example method 2100 of text editing, in accordance with an embodiment of the present disclosure. The method 2100 may be performed by one or more processors of a computing system, such as the one or more processors of the touchscreen device 140 (FIG. 1).

At the operation 2102, the system receives touch input representing a strikethrough at an eighth location of the touchscreen 130 (FIG. 1).

At the operation 2104, the system identifies targeted textual content. The targeted textual content may be content rendered at the eighth location of the touchscreen. The targeted textual content may represent textual content rendered beneath the touch input representing a strikethrough.

Figure 22A:
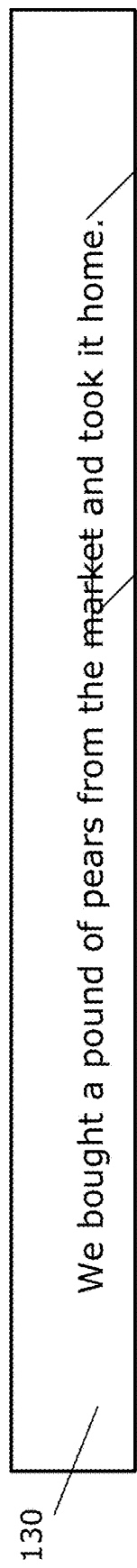
FIGS. 22A, 22B, and 22C illustrate example sentences comprising textual content as may be rendered at a touchscreen, in accordance with examples described herein.

Reference is now made to FIG. 22A, which illustrates the example sentence 1602 comprising textual content as may be rendered at the touchscreen 130. The example sentence 1602 recites:

"We bought a pound of pears from the market and took it home"

In this example, the targeted textual content is the word "market", which is displayed with a strikethrough therethrough.

Returning to FIG. 21, at the operation 2106, the system receives, via the electronic pen, an instruction to activate handwriting recognition. In some embodiments, the instruction may be received via pressure signals representing an amount of pressure at the pen tip. The amount of pressure received at the operation 2106 may be distinguishable from the amount of pressure received at the operation 1906.

At the operation 2108, the system activates handwriting recognition.

At the operation 2110, the system removes the targeted textual content from the eighth location of the touchscreen. Optionally, a highlighted space may be displayed at the eighth location, in which touch input may be received.

In some embodiments, where the system may display one or more content format options (as illustrated by FIGS. 16A and 18A), a user may forgo the selection of the one or more content format options. Instead, an indication to use handwriting and/or voice input may be received by the system, and as a result, a highlighted space may appear at a location of the touchscreen. As noted, an indication to use handwriting and/or voice input may comprise, for example, receiving pressure signals indicating an amount of pressure at the pen tip and/or receiving an input signal indicating a button press at the button.

At the operation 2112, the system receives touch input representing handwriting at the eighth location of the touchscreen.

Figure 22B:
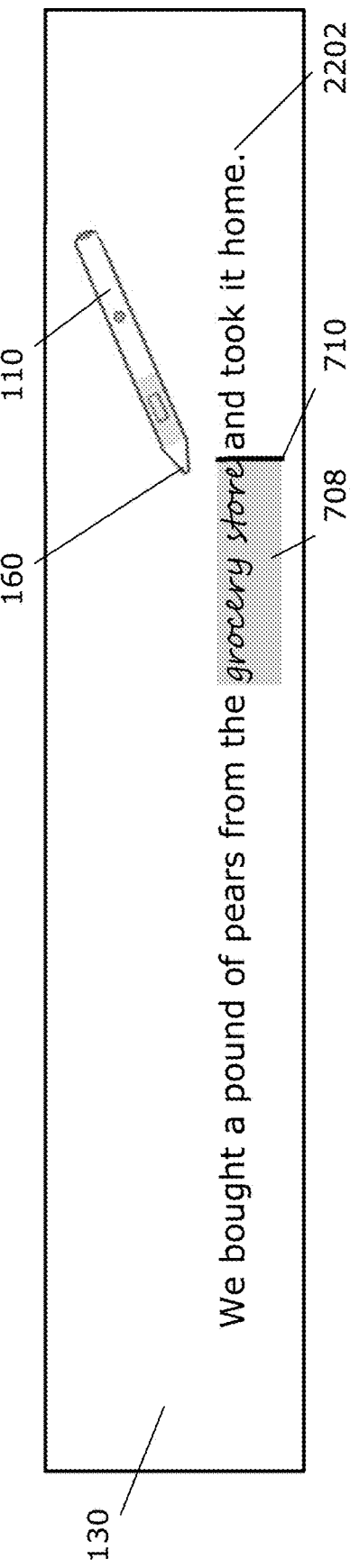

Reference is now made to FIG. 22B, which illustrates an example sentence 2202 comprising textual content as may be rendered at a touchscreen 130. The example sentence 2202 recites, "We bought a pound of pears from the grocery store and took it home"

In this example, the phrase "grocery store" is displayed in handwriting on a highlighted space 708 between the words "the" and "and". The editing cursor 710 is shown positioned after the phrase "grocery store", indicating the location for subsequent text editing. An electronic pen 110 having pen tip 160 is shown near the phrase "grocery store".

Returning to FIG. 21, at the operation 2114, the system converts the touch input representing handwriting into rendered textual content corresponding to the handwriting.

For example, in some implementations, the system may send a representation of the touch input representing handwriting to a Pen Stroke Recognition Engine to convert the handwriting to computer-renderable text. The Pen Stroke Recognition engine may be located, for example, on the computing system. Additionally or alternatively, the Pen Stroke Recognition engine may be a cloud service or may reside on a remote system. The Pen Stroke Recognition engine may utilize OCR and/or NLP neural networks to convert the handwriting to computer-renderable text. The system may receive the computer-renderable text from the Pen Stroke Recognition engine, and may subsequently display the computer-renderable text as textual content on the touchscreen.

Figure 22C:
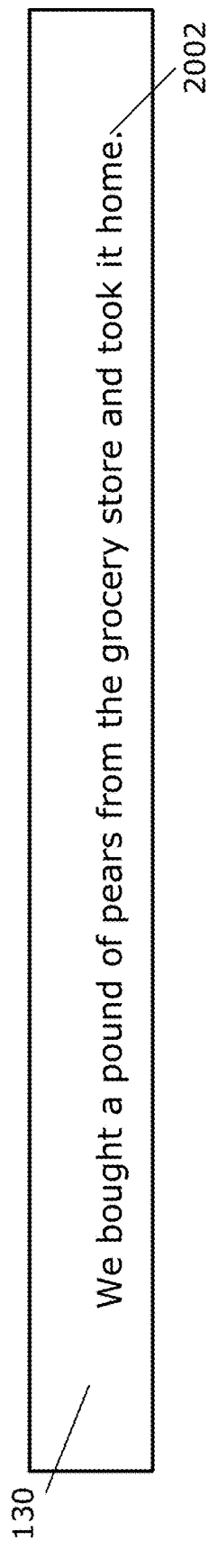

Reference is now made to FIG. 22C, which illustrates the example sentence 2002 on the touchscreen 130. The example sentence 2002 recites:

"We bought a pound of pears from the grocery store and took it home."

FIG. 22C illustrates an example of rendered textual content subsequent to a conversion of the touch input representing handwriting into rendered textual content corresponding to the handwriting.

Figure 23:
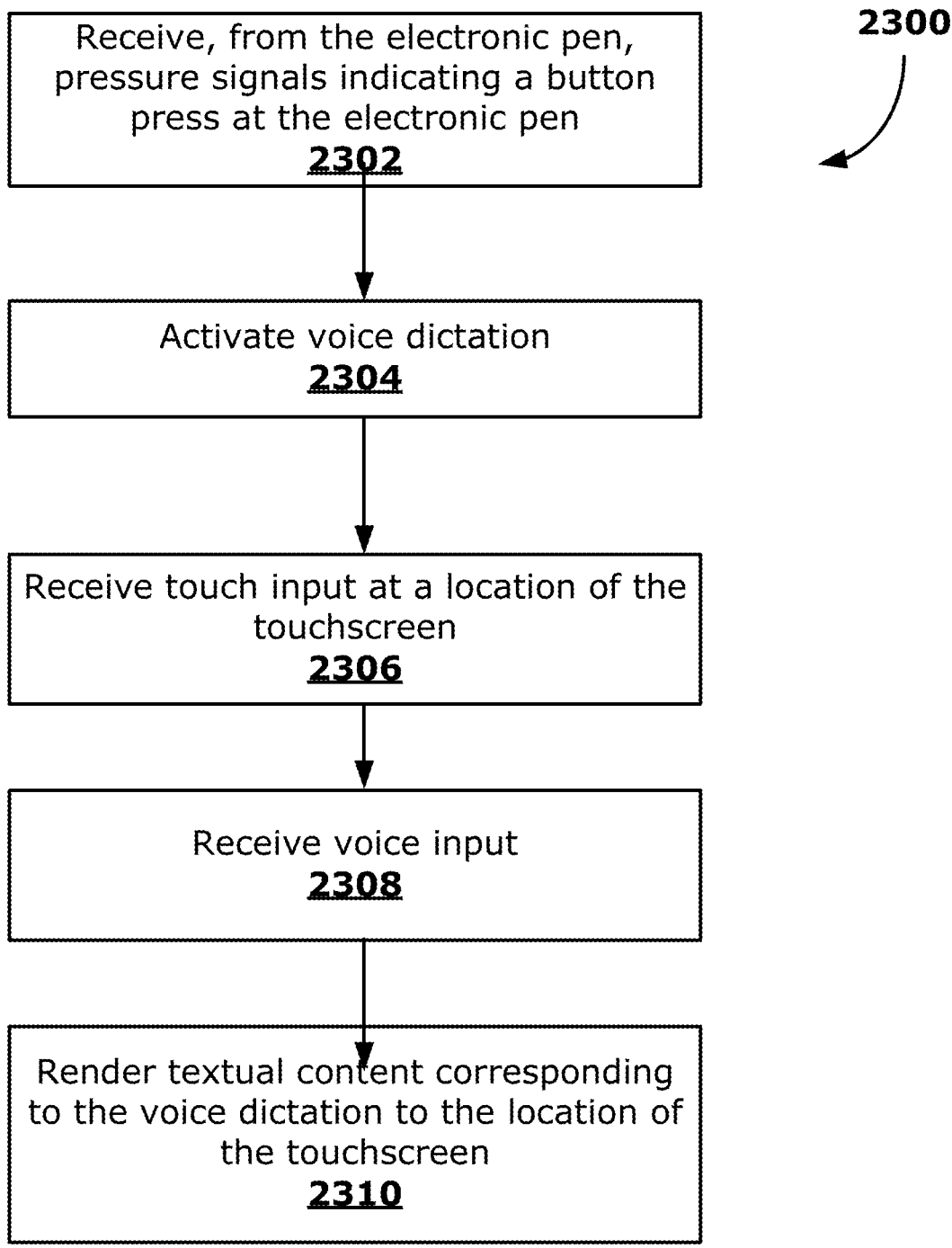
FIG. 23 is a flowchart of an example method of text editing, in accordance with examples described herein.

FIG. 23 is a flowchart of an example method 2300 of text editing, in accordance with an embodiment of the present disclosure. The method 2300 may be performed by one or more processors of a computing system, such as the one or more processors of the touchscreen device 140 (FIG. 1). In the example method 2300, voice dictation may be activated via the electronic pen prior to touch input being received at a location of the touchscreen.

At the operation 2302, the system receives, from the electronic pen in communication with the processor, an input signal indicating a button press at the electronic pen. In some implementations, voice dictation may be activated via other suitable input devices such as a keyboard, a mouse, or headphones having input buttons, for example, via a button press at a keyboard, mouse or headphones.

At the operation 2304, in response to receiving the input signal indicating a button press at the electronic pen, the system activates voice recognition.

At the operation 2306, the system receives touch input at a ninth location of the touchscreen. In some embodiments, the ninth location may correspond to a position preceding a series of rendered content.

At the operation 2308, the system receives voice input. The voice input may be received via a microphone in communication with the processor. In some embodiments, the microphone may be a component of the computer system. In some embodiments, the microphone may be a component of the electronic pen.

At the operation 2310, the system renders textual content corresponding to the voice dictation at the ninth location of the touchscreen.

As noted, in this way, voice dictation may be activated using the electronic pen without prior use of the touchscreen.

Reference is now made to FIGS. 24A, 24B, 24C and 24D, which relate to a particular embodiment of the present application. FIGS. 24A, 24B, 24C and 24D illustrate an example stream of text 2402 as displayed on the touchscreen 130, in accordance with an embodiment of the present disclosure. In each of FIGS. 24A, 24B, 24C and 24D, the example stream of text 2402 recites:

"To do so, I will give you a complete account of the system, and expound the actual teachings of"

Figure 24A:
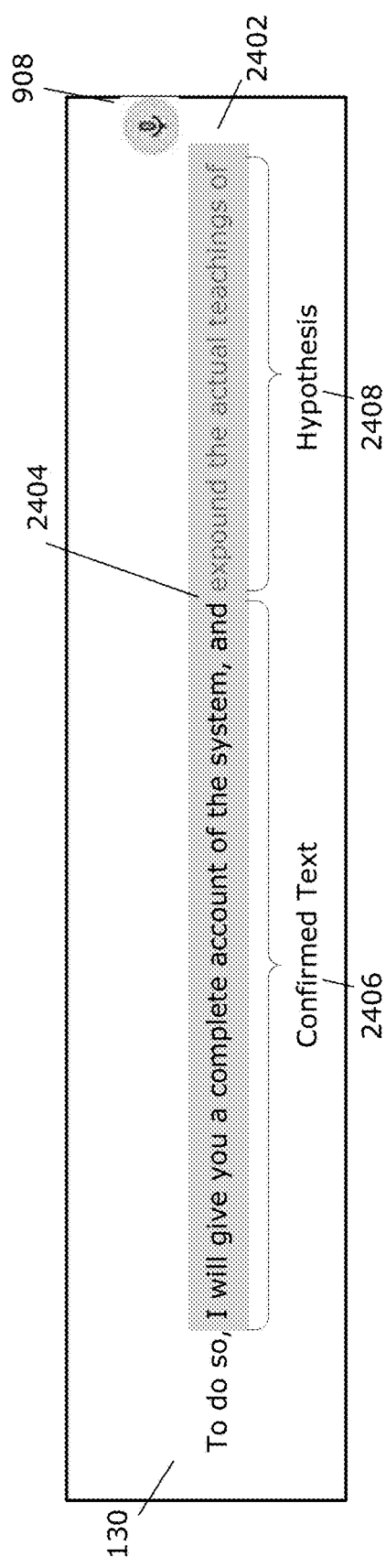
FIGS. 24A, 24B, 24C, and 24D illustrate example sentences comprising textual content as may be rendered at a touchscreen, in accordance with examples described herein.

In each of FIGS. 24ABCD, the example stream of text 2402 includes a first phrase 2404 that comprises a first portion 2406 and a second portion 2408. The first phrase 2404 is identified with a darkened background, and recites:

"I will give you a complete account of the system, and expound the actual teachings of".

A microphone icon 908 is illustrated near the first phrase 2404, which, together with the darkened background, indicate that the first phrase is rendered textual content corresponding to voice input. As noted, the microphone icon 908 may also represent a voice cursor, indicating a position on the touchscreen 130 where voice dictation may be rendered.

The first portion 2406 of the first phrase 2404 is identified with the label "Confirmed Text" and the second portion 2408 of the first phrase 2404 is identified with the label "Hypothesis". The first portion 2406 includes the words:

"I will give you a complete account of the system, and".

The second portion 2408 includes the remaining words of the first phrase 2404, i.e.:

"expound the actual teachings of".

The second portion 2408 is further highlighted using a light font.

In some examples, while receiving voice input, the system may send a signal representing voice input to a Speech Recognition engine that processes the voice input using, for example, a voice recognition algorithm. The Speech Recognition engine may employ NLP neural networks. In some examples, the Speech Recognition engine may be local to the computing system. In other examples, the Speech Recognition engine may be a service, such as a cloud service, or may reside on a remote system. In some examples, the Speech Recognition engine may determine that the voice input corresponds to a voice dictation, and may subsequently convert the representation of the signal representing voice input to computer-renderable textual content. The system may then receive the computer-renderable text from the Speech Recognition engine, and display the computer-renderable text as textual content on the touchscreen. The computer-renderable text may be received in one of a plurality of states. For example, the system may receive computer-renderable text that is in a Confirmed state, indicating that the service has determined that the associated computer-readable text is accurate. Additionally or alternatively, the system may receive computer-readable text that is in a Hypothesis state, indicating that the computer-renderable text is still being processed by the service.

As noted, in some examples of the particular embodiment represented by FIGS. 24A, 24B, 24C and 24D, text in the "Confirmed" state may represent text that has been confirmed by the speech recognition engine. In some examples, text in the confirmed state may remain active for a preset amount of time to receive pen gesture input for punctuation, writing and editing, such as deleting or adding a new line and/or adding and removing spaces.

As noted, in some examples, text in the "Hypothesis" state may represent text that has yet to be confirmed by a speech recognition engine, and may thus be dynamically changing, as may still be being processed by the service. In some examples, pen functionality may be disabled for text in the "Hypothesis" state.

Figure 24B:
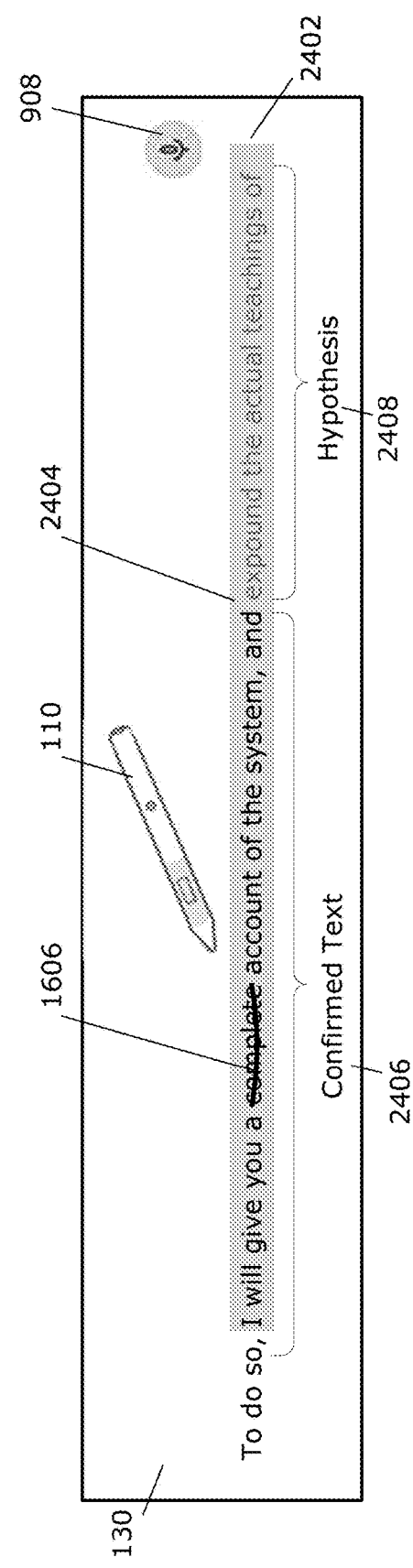

FIG. 24B illustrates additional elements over those of FIG. 24A. Specifically, FIG. 24B illustrates an electronic pen 110 near the word "complete" in the first portion 2406. The word "complete" is shown with a strikethrough 1606 there through, indicating that this text in the "Confirmed" state has received pen gesture editing while voice input continues to be received. The word "complete" may be identified as targeted textual content by the system.

Figure 24C:
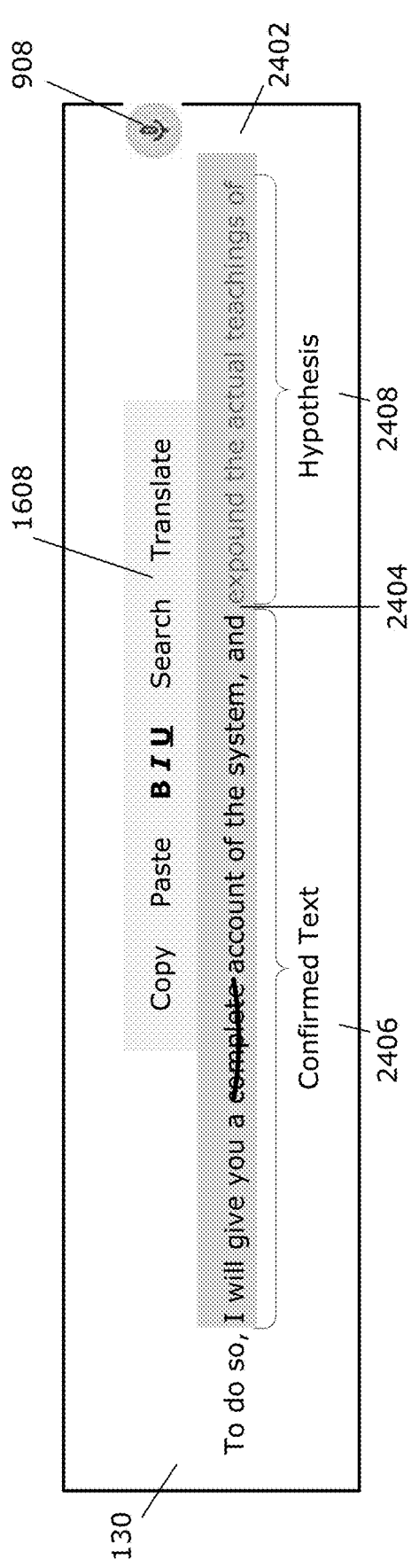

FIG. 24C illustrates additional features beyond those of FIG. 24A. Specifically, FIG. 24C illustrates a selection 1608 of a plurality of content format options near the targeted textual content. In the example of FIG. 24C, the selection 1608 includes "Copy", "Paste", "B I U" (representing the options to highlight with bold font, to highlight with italicized font, and to highlight with underline), "Search" and "Translate".

In the example of FIG. 24C, the voice command being provided is "Underline".

Figure 24D:
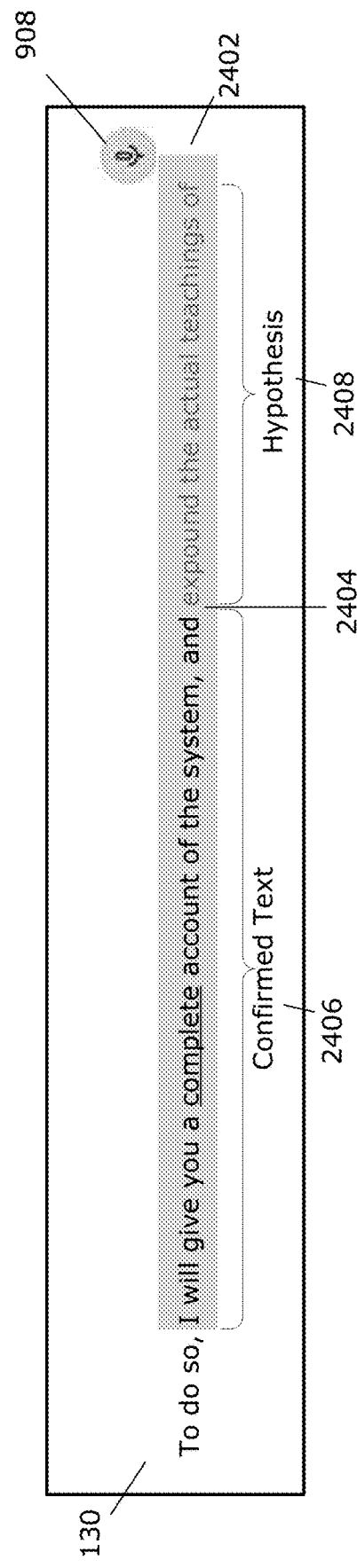

FIG. 24D illustrates additional features beyond those illustrated by FIG. 24C. Specifically, FIG. 24D illustrates the word "complete" as highlighted with underline, indicating that the system has modified the targeted textual content in accordance with the received selection of the one or more content format options.

It will be noted that text in a "Confirmed" state may be edited in additional ways, including any of the above-described pen editing functionality.

As described above with reference to FIGS. 24A-D, in some embodiments, voice dictation and handwriting recognition may be activated contemporaneously. In some particular embodiments, the "Hypothesis" state may last only a few seconds. In some examples, all rendered text may be "Confirmed", i.e., no "Hypothesis" text may be displayed. In some such examples, the rendered text may be treated as normal editable text. As a result, a user may edit the rendered text using the electronic pen and/or a keyboard and/or a mouse (or other suitable input device) without ending the current dictation (e.g., without having to switch between voice input and touch input modalities).

Figure 25:
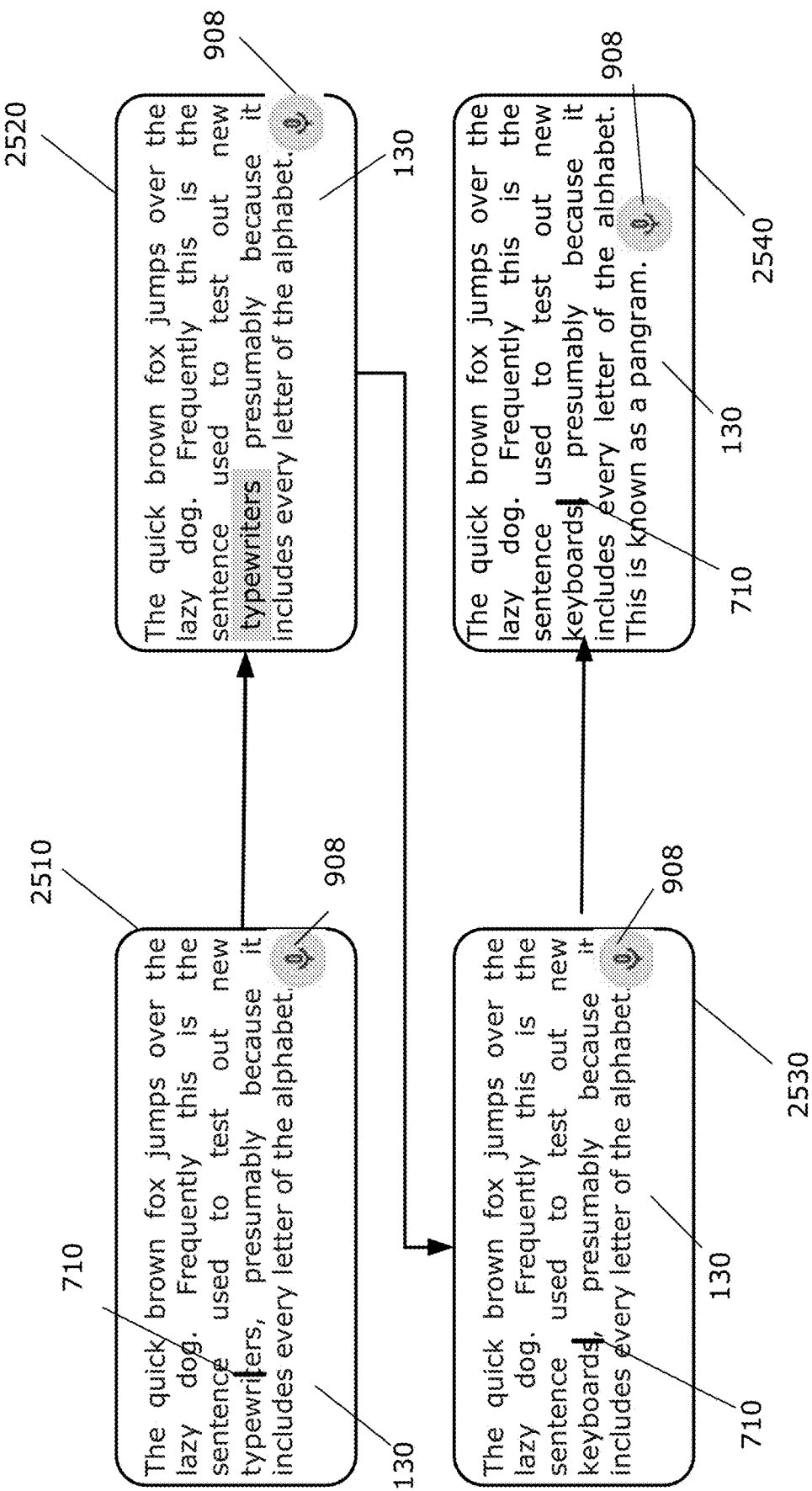
FIG. 25 illustrates an example implementation of contemporaneous voice and text inputs, in accordance with examples described herein.

Reference is now made to FIG. 25, which shows an example implementation of contemporaneous voice recognition and text editing inputs, according to some examples. FIG. 25 illustrates first, second, third and fourth examples 2510, 2520, 2530, 2540, of rendered text displayed on a touchscreen 130, each of which include a microphone icon 908 and/or an editing cursor 710.

The first example 2510 displays the following text:
"The quick brown fox jumps over the lazy dog. Frequently this is the sentence used to test out new typewriters, presumably because it includes every letter of the alphabet."

The editing cursor 710 is displayed upon the rendered word "typewriters", indicating the location of the touchscreen 130 where subsequent text editing may occur. The editing cursor 710 may be a text editing cursor that updates its position and appearance according to a user's touch input selection and/or text editing actions. For example, the location of the editing cursor 710 may reflect the location of a detected touch input (e.g., touching the touchscreen 130 using the electronic pen 110, a finger, etc.) or may reflect the location of a most recent text entry using a keyboard or electronic pen 110, for example. The microphone icon 908 is displayed after the word "alphabet" indicating the location of the touchscreen 130 at which subsequent voice dictation may be rendered. The microphone icon 908 may represent the location of a voice cursor, and as such, may reflect the location of the most recent entry of voice transcription data, and may appear while voice dictation is activated.

The second example 2520 displays the same text as the first example 2510. The second example 2520 shows the word "typewriters" as highlighted, indicating that the user has selected this word for text editing (e.g., using the electronic pen 110, using the examples described previously). It may be noted that the microphone icon 908 is maintained at the location following the word 'alphabet", as in the first example 2510. Thus, touch input (e.g., to select textual content to be edited), does not affect the location in the text where voice input can be provided. This conveniently allows the user to continue providing voice input at the location where voice transcription was last entered, while being able to edit textual content (using a different input modality) elsewhere in the text.

The third example 2530 displays the following text:
"The quick brown fox jumps over the lazy dog. Frequently this is the sentence used to test out new keyboards, presumably because it includes every letter of the alphabet."

As will be noted, the text of the third example 2530 differs from the text of the first and second examples 2510, 2520 in that the word "typewriters" has been replaced with the word "keyboards", as a result of text editing by the user (e.g., by the user providing touch input to select a synonym for the target word "typewriters", by the user typing in the replacement word using a keyboard, or by the user providing handwriting input to replace the target word, such as using the various examples described previously). The editing cursor 710 is displayed following the word "keyboards," indicating the location of the touchscreen 130 where subsequent text editing may occur. Notably, the microphone icon 908 is displayed at the same location following the word 'alphabet", as in the first example 2510.

The fourth example 2540 displays the following text:
"The quick brown fox jumps over the lazy dog. Frequently this is the sentence used to test out new keyboards, presumably because it includes every letter of the alphabet. This is known as a pangram."

As will be noted, the text of the fourth example 2540 differs from the text of the third example 2530 in that an additional sentence, "This is known as a pangram," has been added to the end of the text. In this example, the additional sentence is the result of transcription of a voice input. The editing cursor 710 is maintained at its previous location following the word "keyboards", as in the third example 2530. However, the microphone icon 908 is now displayed following the word "pangram", which reflects the last location that text was rendered as a result of voice dictation.

As illustrated by the examples of FIG. 25, the present disclosure provides examples in which different input modalities may be used to input and/or modify textual content contemporaneously and at different locations in the text. Notably, input using a first input modality (e.g., touch input) may be at a first location indicated by a first cursor (e.g., the editing cursor 710), while input using a second input modality (e.g., voice input) may be at a different second location indicated by a second cursor (e.g., the microphone icon 908). The respective locations of the first and second cursors may change in response to inputs of the respective first and second modalities. In other words, the location of the first cursor may not be affected by input using the second modality and conversely the location of the second cursor may not be affected by input using the first modality. This helps to improve the overall efficiency of the system, by enabling two parallel streams of input using two different modalities contemporaneously, and without requiring switching between the two input modalities. For example, a user may provide continuous voice input to input new text at one location while at the same time manually editing previously rendered text at a different location using touch input (e.g., using an electronic pen 110). It should be noted that, although touch input is described as an example of an input modality for text editing, in some examples other input modalities (e.g., keyboard input, mouse input, etc.) may be used for text editing contemporaneously with voice input.

The contemporaneous use of voice recognition and text editing may have various uses. For example, at a meeting and/or a lecture, a first party may be speaking and that speech may be voice input that is transcribed using voice recognition. At the same time, a second party may make edits to the transcribed text using touch input (e.g., formatting, side notes, misrecognized words) without interrupting the flow of the speaker.

As a further example, a user may use touch input to make edits, (e.g., formatting, side notes, misrecognized words) to the transcription of the user's own voice dictation and enjoy the ease of a voice transcription location that reflects the most recent location of the voice dictation, regardless of a different text editing location.

Figure 26A:
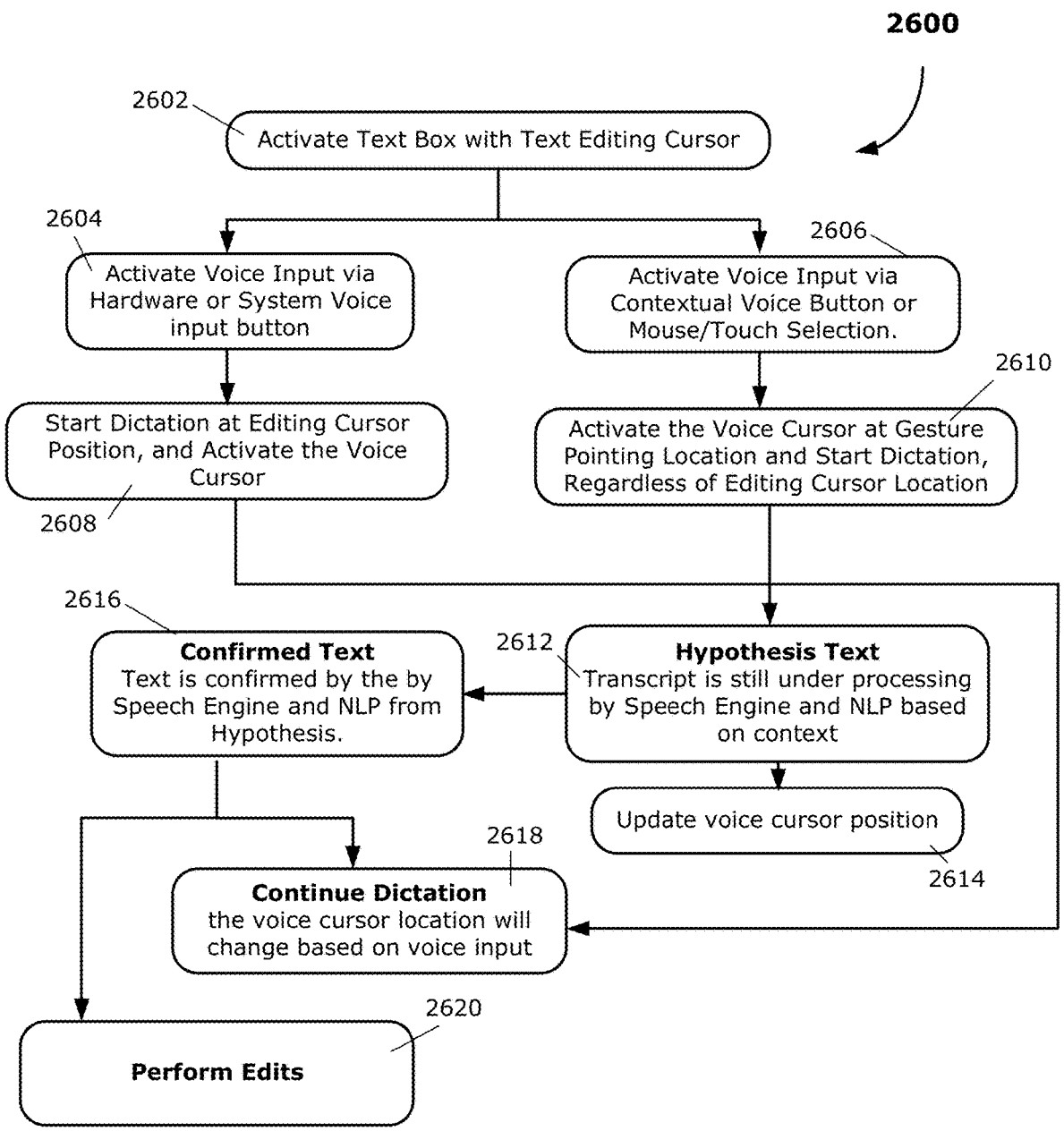
FIGS. 26A and 26B illustrate a flowchart demonstrating how various examples disclosed herein may be implemented together, in accordance with examples described herein.
Figure 26B:
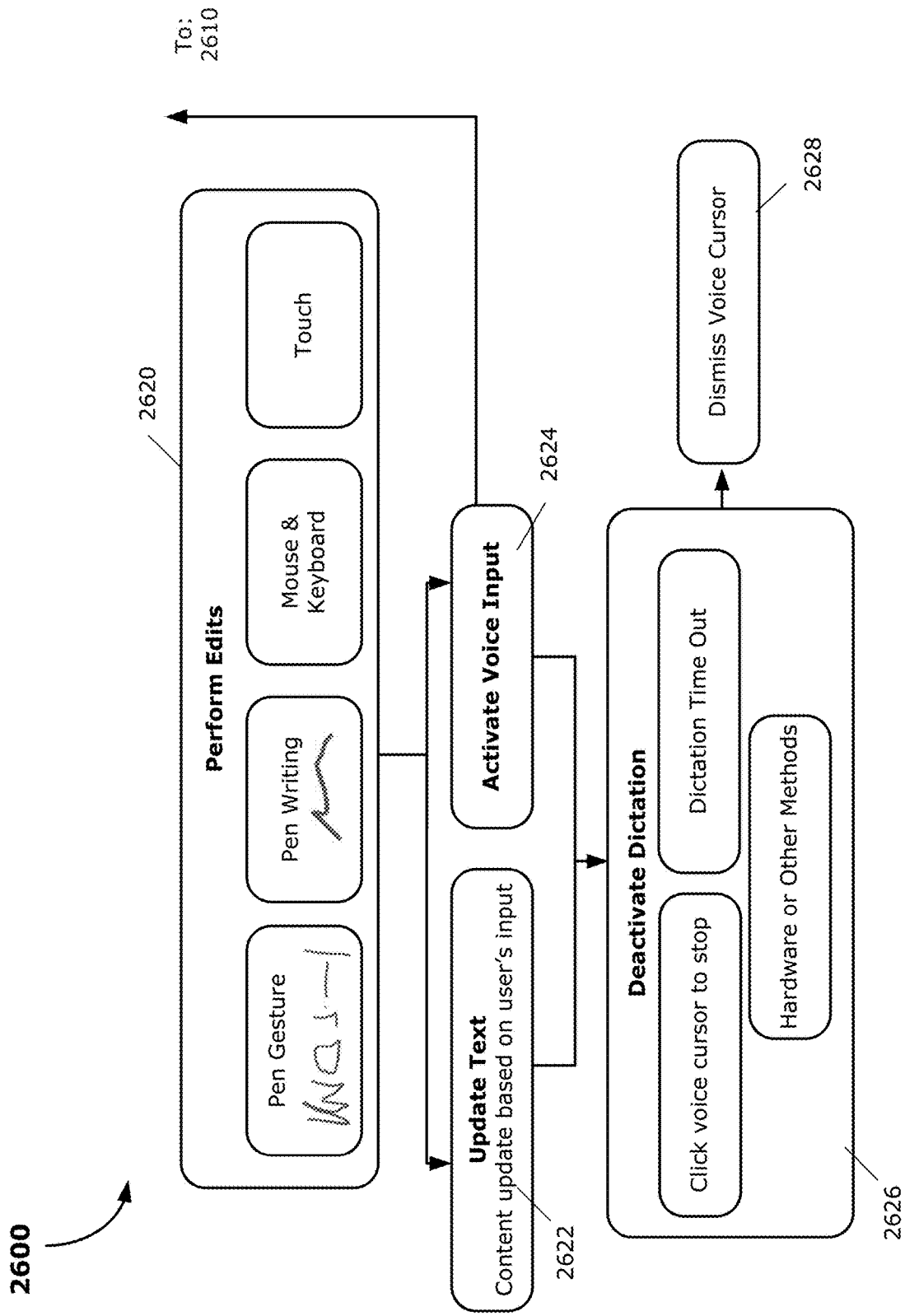

Reference is now made to FIGS. 26A and 26B, which illustrate a flowchart 2600 of an embodiment of the present disclosure, according to some examples. It should be appreciated that the flowchart 2600 illustrate an example combination of various examples disclosed herein. That is, the examples disclosed herein, such as in the flowcharts of FIGS. 6, 8, 10, 13, 15, 17, 19, 21 and 23, may be implemented in combination. Based on the sequence of inputs provided by the user, a system may determine which of the methods illustrated by the aforementioned flowcharts may be carried out.

At the operation 2602, a text box may be activated, by a user, using the text editing cursor.

The operations 2604 and 2606 represent different methods by which voice input/voice recognition may be activated by a user. As shown by the flowchart 2600, the different methods lead to different outcomes.

For example, at the operation 2604, a user may activate voice input/voice recognition using hardware, such as by using pressure at the pen tip, a button on the electronic pen, or another button on a different input device, for example. As a result, the operation 2608 may follow.

At the operation 2608, transcription of voice dictation may begin at the location of an editing cursor, and a voice cursor (microphone icon) may be activated. Following the operation 2608, transcription of voice dictation will continue and the operation 2614 will follow.

At the operation 2614, dictation continues, and the voice cursor (microphone icon) location may change in accordance with the location of the transcribed text.

As another example, at the operation 2606, a user may activate voice input/voice recognition using a contextual voice button in a UI, or via mouse/touch selection. The contextual voice button may be activated using pen gestures or by mouse/touch selection (e.g., drawing an ellipse on the touchscreen, applying pressure to a location of the touchscreen, or by drawing a strikethrough at a location of the touchscreen.) As a result, the user may proceed to operation 2610.

At the operation 2610, the voice cursor (microphone icon) may activate at a gesture pointing location, and transcription of voice dictation may begin at the gesture pointing location, regardless of the location of the editing cursor.

Following the operation 2610, the operation 2612 is next.

At the operation 2612, the system may render text to the touchscreen as "Hypothesis" text. As previously described, a speech engine and/or NLP may still be processing the "Hypothesis" text based on context.

At the operation 2614, the system may update the voice cursor (microphone icon) location in accordance with the location of the transcribed text.

As text moves from a "Hypothesis" state to a "Confirmed" state, as previously described, operation may proceed to the operation 2616.

At the operation 2616, text may be confirmed by the speech engine and/or NLP. Once the text is confirmed, a user may have the option to proceed to the operation 2618 and continue dictation, or to proceed to the operation 2620 and perform edits.

At the operation 2620, a user may perform edits. A user may edit content, for example, by moving the editing cursor using different input devices, and by then performing normal text editing. For example, as illustrated, a user may perform text editing using pen gestures, using handwriting, using the mouse and/or keyboard, and/or by applying touch to the touchscreen. Depending upon the actions performed by the user, different outcomes may follow.

For example, the edits performed by the user may result in operations proceeding to the operations 2624.

At the operation 2624, voice input may be activated. Voice input may be activated by a user via a contextual voice button in a UI, via pen gestures or mouse/touch selection, or via drawing an ellipse. Following the operation 2624, operation may then proceed to the operation 2610, discussed above.

As another example, the edits performed by a user at the operation 2620 may result in operation proceeding to the operation 2622.

At the operation 2622, text may be updated. The content of the updating may be based upon the user's input.

After the operations 2622 and 2624, the operation 2626 may follow.

At the operation 2626, voice dictation may be deactivated. For example, the user may deactivate dictation by clicking on the voice cursor (microphone icon), by applying pressure to the pen tip, by pressing a button on the electronic pen or by pressing another button, for example. As a further example, dictation may be deactivated because of a time out period. In some examples, a time out period may be implemented and may be set and/or adjustable by a user. The time out period may prescribe a period of time, from the time of voice dictation activation, for example, after which voice dictation will automatically deactivate. The time out period may alternatively prescribe a period of voice input inactivity, for example, after which voice dictation will automatically deactivate.

Following the operation 2626, the operation 2628 is next.

At the operation 2628, the voice cursor is dismissed. The voice cursor may be dismissed automatically as a result of voice dictation being deactivated.

General

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A computer system comprising:
    a touchscreen;
    a processor; and
    a memory coupled to the processor, the memory storing instructions which, when executed by the processor, cause the system to, during execution of a text editing application:
        receive, from an electronic pen in communication with the processor, pressure signals indicating a detection of a first amount of pressure at a pen tip;
        in response to receiving the pressure signals indicating the detection of a first amount of pressure at the pen tip, activate handwriting recognition;
        receive touch input representing handwriting at a first location of the touchscreen;
        convert the touch input representing handwriting into rendered textual content corresponding to the handwriting;
        receive touch input at a second location of the touchscreen;
        receive, from the electronic pen, a request to activate voice recognition, the request to activate voice recognition being received via pressure signals, from the electronic pen, indicating a detection of a second amount of pressure at the pen tip, the second amount of pressure being distinguishable from the first amount of pressure;
        activate voice recognition;
        receive, from a microphone in communication with the processor, a signal representing voice input; and
        convert the signal representing voice input into rendered textual content corresponding to the voice input.

2. The system of claim 1, wherein the electronic pen further includes a button, and wherein the request to activate voice recognition is also receivable via an input signal indicating a button press at the button.

3. The system of claim 1, wherein the system is further caused to:
    receive touch input representing an ellipse at a third location of the touchscreen;
    identify targeted textual content, the targeted textual content being textual content rendered at the third location of the touchscreen;
    determine one or more replacement text candidates corresponding to the targeted textual content;
    display the one or more replacement text candidates as selectable options for replacement of the targeted textual content; and
    in response to a selection of one of the one or more replacement text candidates, replace the targeted textual content with the selected one of the one or more replacement text candidates.

4. The system of claim 1, wherein the system is further caused to:
    receive touch input representing an ellipse at a fourth location of the touchscreen;
    identify targeted textual content, the targeted textual content being textual content rendered to the fourth location of the touchscreen;
    receive input representing replacement content; and
    replace the targeted textual content with rendered textual content corresponding to the replacement content.

5. The system of claim 4, wherein the received input is touch input representing handwriting.

6. The system of claim 4, wherein the received input is voice input representing dictation.

7. The system of claim 1, wherein the system is further caused to:

receive touch input representing a strikethrough at a fifth location of the touchscreen;
identify targeted textual content, the targeted textual content being textual content rendered beneath the touch input representing a strikethrough;
display one or more content format options near the targeted textual content;
receive a selection of one or more content format options; and
modify the targeted textual content in accordance with the received selection of the one or more content format options.

8. The system of claim 1, wherein the system is further caused to:
receive touch input representing a strikethrough at a sixth location of the touchscreen;
identify targeted textual content, the targeted textual content being textual content rendered beneath the touch input representing a strikethrough;
receive, via the electronic pen, an instruction to activate voice recognition;
activate voice recognition;
receive, from a microphone in communication with the processor, a signal representing voice input;
identify the voice input as a voice command corresponding to a content format option; and
modify the targeted textual content in accordance with the content format option.

9. The system of claim 1, wherein the system is further caused to:
receive touch input representing a strikethrough at a seventh location of the touchscreen;
identify targeted textual content, the targeted textual content being textual content rendered beneath the strikethrough;
receive, via the electronic pen, an instruction to activate voice recognition;
activate voice recognition;
receive, via a microphone in communication with the processor, voice input;
identify the voice input as a voice dictation; and
replace the targeted textual content with content corresponding to the voice dictation.

10. The system of claim 1, wherein the system is further caused to:
in response to receiving the request to activate voice recognition, display a voice cursor at the second location of the touchscreen, the voice cursor indicating the second location for rendering voice input;
receive further touch input at an eighth location of the touchscreen;
in response to receiving the further touch input at the eighth location of the touchscreen, display an editing cursor at the eighth location of the touchscreen for editing textual content;
wherein the voice cursor is positioned relative to the voice input and wherein the editing cursor is positioned relative to the further touch input independently of each other; and
wherein the voice input is processed contemporaneously with the processing of the further touch input.

11. The system of claim 10, wherein the further touch input is handwriting.

12. The system of claim 10, wherein the further touch input is a selection of a replacement text candidate.

13. A computer-implemented method for execution during a text editing application, the method comprising:
receiving, from an electronic pen, pressure signals indicating a detection of a first amount of pressure at a pen tip;
in response to receiving the pressure signals indicating the detection of a first amount of pressure at the pen tip, activating handwriting recognition;
receiving touch input representing handwriting at a first location of a touchscreen;
converting the touch input representing handwriting into rendered textual content corresponding to the handwriting;
receiving touch input at a second location of the touchscreen;
receiving, from the electronic pen, a request to activate voice recognition, the request to activate voice recognition being received via pressure signals, from the electronic pen, indicating a detection of a second amount of pressure at the pen tip, the second amount of pressure being distinguishable from the first amount of pressure;
activating voice recognition;
receiving, from a microphone, a signal representing voice input; and
converting the signal representing voice input into rendered textual content corresponding to the voice input.

14. The method of claim 13, wherein the electronic pen further includes a button, and wherein the request to activate voice recognition is also receivable via pressure signals from the button.

15. The method of claim 13, the method further comprising:
receiving touch input representing an ellipse at a third location of the touchscreen;
identifying targeted textual content, the targeted textual content being textual content rendered at the third location of the touchscreen;
determining one or more replacement text candidates corresponding to the targeted textual content;
displaying the one or more replacement text candidates as selectable options for replacement of the targeted textual content; and
in response to a selection of a selected one replacement text candidate, replacing the targeted textual content with the selected one replacement text candidate.

* * * * *